(12) United States Patent
Takasuka et al.

(10) Patent No.: US 6,192,020 B1
(45) Date of Patent: Feb. 20, 2001

(54) SEMICONDUCTOR LASER DEVICE

(75) Inventors: Shouichi Takasuka, Osaka; Shin-ichi Ijima, Takatsuki; Hideyuki Nakanishi, Otsu; Akio Yoshikawa, Kyotanabe, all of (JP)

(73) Assignee: Matsushita Electronics Corporation, Osaka (JP)

( * ) Notice: Under 35 U.S.C. 154(b), the term of this patent shall be extended for 0 days.

(21) Appl. No.: 09/164,726

(22) Filed: Oct. 1, 1998

(30) Foreign Application Priority Data

Oct. 1, 1997 (JP) .................................................. 9-268467
Oct. 1, 1997 (JP) .................................................. 9-268488

(51) Int. Cl.[7] ........................................................ G11B 7/12
(52) U.S. Cl. ........................... 369/103; 369/110; 369/112; 369/44.12; 369/44.23
(58) Field of Search ............................... 369/44.23, 44.14, 369/44.41, 112, 103, 110, 109, 111, 44.12, 44.28

(56) References Cited

U.S. PATENT DOCUMENTS 5,903,529 * 5/1999 Nishi et al. ......................... 369/44.23

FOREIGN PATENT DOCUMENTS 6-168462   6/1994  (JP) .

* cited by examiner

*Primary Examiner*—Muhammad Edun
(74) *Attorney, Agent, or Firm*—Ratner & Prestia

(57) ABSTRACT

A semiconductor laser device includes a semiconductor laser element for emitting laser light onto a recording medium; beam dividing element provided in an optical path between the semiconductor laser element and the recording medium; a hologram optical element including a diffraction grating formed in a light-transmitting substrate, the hologram optical element located in an optical path between the beam dividing element and the semiconductor laser element; a servo-signal light-receiving element provided in an optical path of diffracted light transmitted through the diffraction grating for receiving the diffracted light; an information-signal light-receiving element for receiving light divided by the beam-dividing element, which is different from light divided by the beam-dividing element which is received by the diffraction grating; and a polarizing element provided in an optical path between the beam dividing element and the information-signal light-receiving element, wherein the semiconductor laser element, the servo-signal light-receiving element and the information-signal light-receiving element are provided within a single package, and the information-signal light-receiving element is provided outside an optical path of every order of diffracted light transmitted through the diffraction grating.

21 Claims, 23 Drawing Sheets

SEMICONDUCTOR LASER DEVICE

BACKGROUND OF THE INVENTION

1. Field of the Invention

The present invention relates to a semiconductor laser device which is preferably used as a light source of a magneto-optical pick-up device for recording and/or reproducing information onto or from an information recording medium.

2. Description of the Related Art

A conventional semiconductor laser device used for magneto-optical pick-up (Japanese Laid-open Publication No. 6-168462) will now be described with respect to its configuration and operation.

First, the configuration of the conventional semiconductor laser device will be described. FIG. 30 is a diagram showing an optical system of the conventional semiconductor laser device and an information recording medium. Referring to FIG. 30, a semiconductor laser element 101 and a servo-signal light-receiving element 102 for detecting a focus error signal and a radial error signal are provided within a semiconductor laser unit 107. A polarization beam splitter 111, a collimator lens 112 and an objective lens 113 are sequentially placed in this order in the optical path from the semiconductor laser element 101 to an information recording medium 114. The polarization beam splitter 111 is secured on the top of the semiconductor laser unit 107. A diffraction grating 109 is formed at the surface of the polarization beam splitter 111 which faces the semiconductor laser element 101. Moreover, an information-signal light-receiving element 104 is provided outside the optical path between the semiconductor laser element 101 and the information recording medium 114. The information-signal light-receiving element 104 is divided into two elements for p-polarized light components and s-polarized light components, respectively. A Wollaston prism 116 is provided at the surface of the polarization beam splitter 111 which faces the information-signal light-receiving element 104.

Next, the operation of the conventional semiconductor laser device will be described. Light is emitted from the semiconductor laser element 101 onto the information recording medium 114. The light reflected from the information recording medium 114 (hereinafter, the reflected light is referred to as return light) passes through the objective lens 113 and the collimator lens 112 into the polarization beam splitter 111. The polarization beam splitter 111 partially reflects the return light into the Wollaston prism 116, while transmitting the remaining return light therethrough. The Wollaston prism 116 has different refractive indices for p-polarized light and s-polarized light, respectively. Therefore, the return light entering the Wollaston prism 116 is divided into a p-polarized light component and an s-polarized light component in the Wollaston prism 116. The two elements of the information signal light-receiving element 104 are located at the positions on which the two divided light components for an information signal are focused, respectively. The information signal is calculated based on an output of the information-signal light-receiving element 104. The remaining return light having passed through the polarization beam splitter 111 is diffracted by the diffraction grating 109 into the servo-signal light-receiving element 102. The focus error signal and the radial error signal are detected based on an output value from the servo-signal light-receiving element 102.

According to the conventional semiconductor laser device shown in FIG. 30, the information-signal light-receiving element 104 is separately provided outside the semiconductor laser unit 107, whereby the overall size of the device is increased.

In order to provide a smaller and thinner semiconductor laser device which solves the above-mentioned problem, an information-signal light-receiving element may be placed within a semiconductor laser unit, as shown in FIG. 31. Such a semiconductor laser device will now be described with respect to its configuration and operation with reference to FIG. 31.

FIG. 31 shows another conventional semiconductor laser device and an information recording medium. First, the configuration of this conventional semiconductor laser device will be described. Referring to FIG. 31, a semiconductor laser element 201 and servo-signal light-receiving elements 202 and 203 are provided within a package 205. The package 205 is sealed by a transparent seal substrate 206. Thus, a semiconductor laser unit 207 is configured. A light-transmitting substrate 208, a collimator lens 212 and an objective lens 213 are sequentially provided in this order in the optical path from the semiconductor laser element 201 to an information recording medium 214. A hologram optical element 228 includes a diffraction grating 209 and a three-beam generating diffraction grating 210. The diffraction grating 209 is formed at the surface of the light-transmitting substrate 208 which faces the collimator lens 212, whereas the three-beam generating diffraction grating 210 is formed at the surface of the light-transmitting substrate 208 which faces the seal substrate 206.

Hereinafter, the operation of the conventional semiconductor laser device shown in FIG. 31 will be described. Light emitted from the semiconductor laser element 201 is divided into three light beams by the three-beam generating diffraction grating 210. More specifically, the three-beam generating diffraction grating 210 divides incident light into positive first-order light which is diffracted in the direction perpendicular to the plane of FIG. 31 from the rear to the front of the plane of FIG. 31, 0th-order light which is not diffracted, and negative first-order light which is diffracted in the direction perpendicular to the plane of FIG. 31 from the front to the rear of the plane of FIG. 31. The three light beams thus divided pass through the hologram optical element 228, and then, through the collimator lens 212 and the objective lens 213 so as to be focused onto the information recording medium 214. The light beam reflected from the information recording medium 214, that is return light, is directed back to the hologram optical element 228 through the same optical path. Thereafter, the return light is diffracted by the diffraction grating 209 of the hologram optical element 228 so as to be focused onto a focus-error-signal light-receiving region (not shown) and a radial-error-signal light-receiving region (not shown) of the servo-signal light-receiving elements 202 and 203. Each of the focus-error-signal light-receiving region and the radial-error-signal light-receiving region is divided into a plurality of elements. A focus error signal is detected by first converting a current output from each element of the focus-error-signal light-receiving region to a voltage, and then, performing a differential operation of the voltages thus converted. A radial error signal is similarly detected by a differential detection method using a three-beam method. An information signal is obtained by first converting a current output from each element of the focus-error-signal light-receiving region to a voltage and then calculating the sum of the voltages thus converted.

The conventional semiconductor laser device shown in FIG. 31 obtains the information signal by calculating the sum of the signals from the plurality of elements. Therefore, a noise component of the signal from each element is added. As a result, the total noise component is increased according to the number of elements, causing significant reduction in a signal/noise (S/N) ratio.

SUMMARY OF THE INVENTION

According to one aspect of the present invention, a semiconductor laser device includes a semiconductor laser element for emitting laser light onto a recording medium; beam dividing means provided in an optical path between the semiconductor laser element and the recording medium; a hologram optical element including a diffraction grating formed in a light-transmitting substrate, the holograph optical element located in an optical path between the beam dividing means and the semiconductor laser element; a servo-signal light-receiving element provided in an optical path of diffracted light transmitted through the diffraction grating for receiving the diffracted light; an information-signal light-receiving element for receiving light divided by the beam-dividing means, which is different from light divided by the beam-dividing means which is received by the diffraction grating; and a polarizing element provided in an optical path between the beam dividing means and the information-signal light-receiving element, wherein the semiconductor laser element, the servo-signal light-receiving element and the information-signal light-receiving element are provided within a single package, and the information-signal light-receiving element is provided outside an optical path of every order of diffracted light transmitted through the diffraction grating.

According to another aspect of the present invention, a semiconductor laser device includes a semiconductor laser element for emitting laser light onto a recording medium; beam dividing means provided in an optical path between the semiconductor laser element and the recording medium; a hologram optical element including a diffraction grating formed in a light-transmitting substrate, the hologram optical element located in an optical path between the beam dividing means and the semiconductor laser element; a servo-signal light-receiving element provided in an optical path of diffracted light transmitted through the diffraction grating for receiving the diffracted light; and an information-signal light-receiving element for receiving light divided by the beam-dividing means, which is different from light divided by the beam-dividing means which is received by the diffraction grating, wherein the semiconductor laser element, the servo-signal light-receiving element and the information-signal light-receiving element are provided within a single package, and the information-signal light-receiving element is provided outside an optical path of every order of diffracted light transmitted through the diffraction grating.

In one example, reflecting means is provided in the optical path between the beam dividing means and the information-signal light-receiving element.

In one example, the diffraction grating is divided into a plurality of sections.

In one example, each of the sections have a different lens effect.

In one example, the hologram optical element has a lens effect for collimating laser light emitted from the semiconductor laser element.

In one example, in the light-transmitting substrate, a thickness of a portion of the light transmitting substrate through which incident light onto the servo-signal light-receiving element is transmitted, and a thickness of a portion of the light-transmitting substrate through which incident light onto the information-signal light-receiving element is transmitted may be individually set, whereby a focal point of the incident light onto the servo-signal light-receiving element and a focal point of the incident light onto the information-signal light-receiving element are individually adjusted.

In one example, the polarizing element and the reflecting means are integrally formed such that the polarizing element is located between the hologram optical element and the reflecting means, and a base of the hologram optical element having a height larger than a thickness of the polarization element is provided at the hologram optical element.

In one example, the package is sealed by the hologram optical element.

Thus, the invention described herein makes possible the advantage of providing a semiconductor laser device which can be reduced in size and thickness without reducing the S/N ratio.

This and other advantages of the present invention will become apparent to those skilled in the art upon reading and understanding the following detailed description with reference to the accompanying figures.

DESCRIPTION OF THE PREFERRED EMBODIMENTS

Example 1

Hereinafter, a semiconductor laser device according to Example 1 of the present invention will be described with respect to its configuration and operation.

Figure 1:
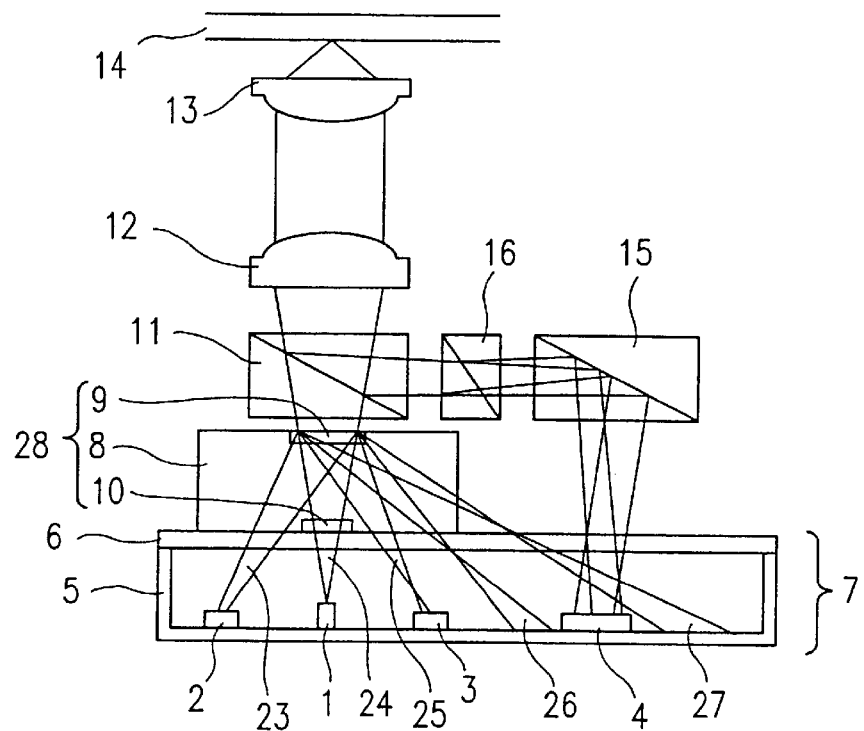
FIG. 1 is a diagram schematically showing a configuration of a semiconductor laser device according to Example 1 of the present invention.

First, the configuration of the semiconductor laser device of Example 1 will be described. FIG. 1 is a diagram showing a configuration of the semiconductor laser device of Example 1. Referring to FIG. 1, a semiconductor laser element 1, servo-signal light-receiving element 2 and 3 for detecting a radial error signal and a focus error signal, and an information-signal light-receiving element 4 are provided within a single package 5. The information-signal light-receiving element 4 is divided into two elements (not shown) for p-polarized light and s-polarized light, respectively. The package 5 is sealed by a transparent seal substrate 6 which is formed form a material such as glass or resin. Thus, a semiconductor laser unit 7 is formed.

A hologram optical element 28, a polarization beam splitter 11 which serves as beam dividing means, a collimator lens 12 and an objective lens 13 are sequentially provided in this order in the optical path from the semiconductor laser unit 7 to an information recording medium 14 for recording and/or reproducing information. The hologram optical element 28 includes a diffraction grating 9 and a three-beam generating diffraction grating 10. The diffraction grating 9 is formed at the surface of a light transmitting substrate 8 which faces the polarization beam splitter 11. The three-beam generating diffraction grating 10 for dividing incident light into three beams is formed at the opposite surface of the light transmitting substrate 8 which faces the seal substrate 6. The three-beam generating diffraction grating 10 divides incident light into positive first-order light which is diffracted in the direction perpendicular to the plane of FIG. 1 from the rear to the front of the plane of FIG. 1, 0th-order light which is not diffracted, and negative first-order light which is diffracted in the direction perpendicular to the plane of FIG. 1 from the front to the rear of the plane of FIG. 1. A reflector 15 is provided in the optical path between the polarization beam splitter 11 and the information-signal light-receiving element 4. A Wollaston prism 16 is provided in the optical path between the polarization beam splitter 11 and the reflector 15, and serves as a polarizing element.

Hereinafter, the operation of the semiconductor laser device according to Example 1 will be described.

Referring to FIG. 1, light emitted from the semiconductor laser element 1 sequentially passes through the hologram optical element 28 and the polarization beam splitter 11 into the collimator lens 12. The collimator lens 12 changes the incident light from a divergent luminous flux to a parallel luminous flux. The parallel light thus obtained passes through the objective lens 13 so as to be focused onto the information recording medium 14. This light is reflected at the surface of the information recording medium 14. Then, the reflected light, i.e., return light sequentially passes through the objective lens 13 and the collimator lens 12 into the polarization beam splitter 11. The polarization beam splitter 11 partially reflects the return light into the Wollaston prism 16, while transmitting the remaining return light therethrough into the hologram optical element 28. The light directed into the hologram optical element 28 is diffracted by the diffraction grating 9. For simplicity, diffracted light other than negative first-order diffracted light 23, 0th-order diffracted light 24, positive first-order diffracted light 25, positive second-order diffracted light 26 and positive third-order diffracted light 27 is omitted in FIG. 1. A focus error signal is detected by an SSD (Spot Size Detection) method using the negative first-order diffracted light 23, and the positive first-order diffracted light 25, whereas a radial error signal is detected by a differential detection method using a three-beam method by using the negative first-order diffracted light 23 and the positive first-order diffracted light 25. The information-signal light-receiving element 4 is located between the respective optical paths of the positive second-order diffracted light 26 and the positive third-order diffracted light 27. Therefore, the information-signal light-receiving element 4 does not directly receive diffracted light from the diffraction grating 9.

Figure 2:
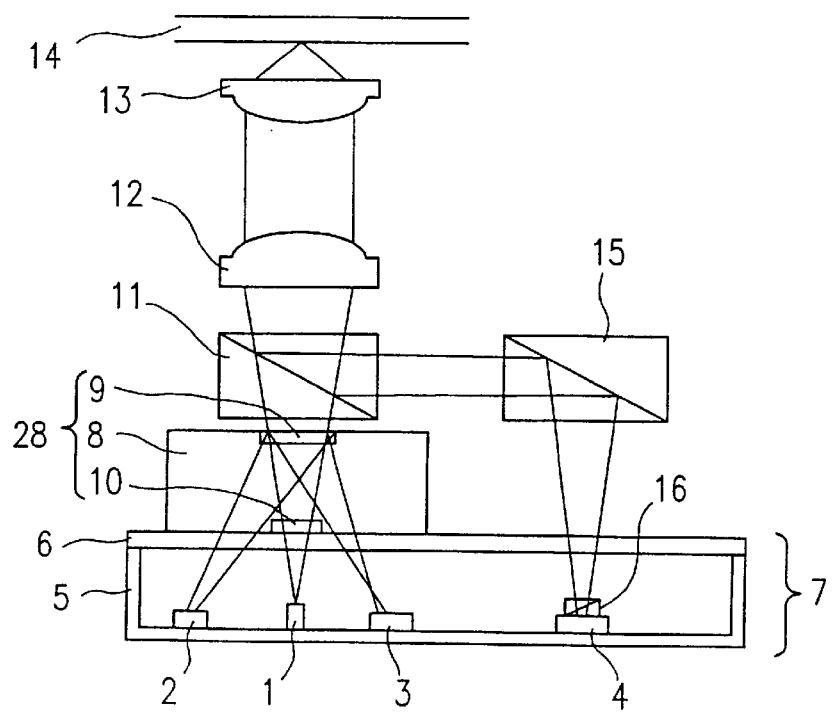
FIG. 2 is a diagram schematically showing a configuration of a first modification of the semiconductor laser device of FIG. 1.

It should be noted that, for simplicity, diffracted light other than the negative first-order diffracted light 23, the 0th-order diffracted light 24 and the positive first-order diffracted light 25 is omitted in FIG. 2 and the figures following FIG. 2.

As described above, the polarization beam splitter 11 partially reflects the return light into the Wollaston prism 16. The light thus directed into the Wollaston prism 16 is divided into p-polarized light and s-polarized light by the Wollaston prism 16. The p-polarized light and s-polarized light thus obtained are reflected by the reflector 15 into the two elements (not shown) of the information-signal light-receiving element 4, respectively. An information signal is obtained by differential detection of the p-polarized light and s-polarized light.

Thus, according to the present example, not only the semiconductor laser element 1 and the servo-signal light-receiving elements 2 and 3 but also the information-signal light-receiving element 4 are provided within the same package, whereby a smaller and thinner semiconductor laser device for magneto-optical pick-up can be provided.

According to the present example described above, the semiconductor laser device has an optical system including the collimator lens 12 and the objective lens 13. However, the semiconductor laser device of the present invention may alternatively have an optical system including only the objective lens 13. In this case, the objective lens 13 is interposed between the semiconductor laser element 1 and the information recording medium 14 such that the semiconductor laser element 1 and the information recording medium 14 are located at the focal points on both sides of the objective lens 13, respectively.

The reflector 15 may be formed by a total-reflecting mirror. In this case, light for the information signal is entirely directed into the information-signal light-receiving element 4. As a result, light is more efficiently utilized, whereby the S/N ratio is improved.

The Wollaston prism 16 can be located at any position in the optical path between the polarization beam splitter 11 and the information-signal light-receiving element 4. For example, the Wollaston prism 16 may be integrated on the information-signal light-receiving element 4, as shown in FIG. 2. In this case, the degree of integration of the optical parts is increased, whereby a smaller and thinner semiconductor laser device can be produced.

Figure 3:
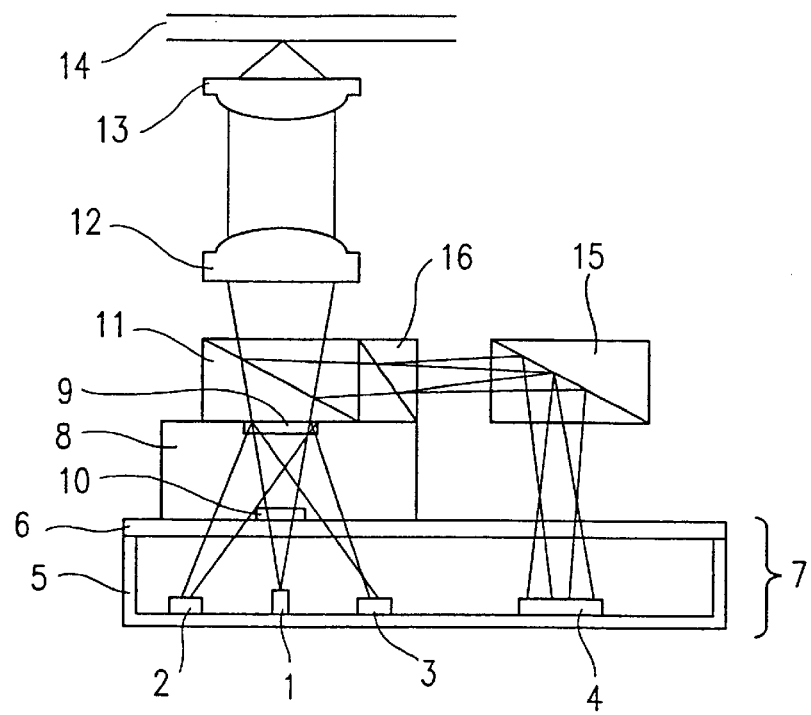
FIG. 3 is a diagram schematically showing a configuration of a second modification of the semiconductor laser device of FIG. 1.
Figure 4:
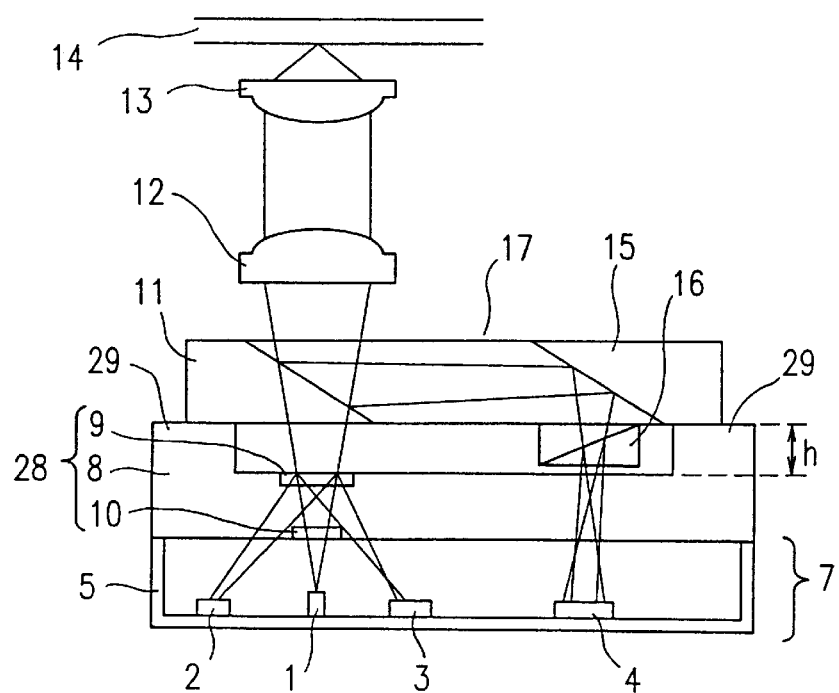
FIG. 4 is a diagram schematically showing a configuration of a third modification of the semiconductor laser device of FIG. 1.

Some optical parts, such as the polarization beam splitter 11 and the hologram optical element 28, may be integrated as shown in FIG. 3. Alternatively, as shown in FIG. 4, all of the optical parts may be integrated onto the semiconductor laser unit 7 by integrally forming the polarization beam splitter 11, the reflector 15 and the Wollaston prism 16 into a complex prism 17, and placing the complex prism 17 between bases 29 located at both ends of the hologram optical element 28 and having a height h larger than a thickness of the Wollaston prism 16. Thus, a plurality of optical parts are integrated, whereby the size and thickness of the semiconductor laser device can further be reduced. It should be noted that, according to the semiconductor laser device of FIG. 4, the seal substrate 6 is eliminated, and the package 5 is sealed by the hologram laser element 28 instead of the seal substrate 6. Thus, not only the reduction in size and thickness of the semiconductor laser device but also reduction in cost can be achieved.

Figure 5:
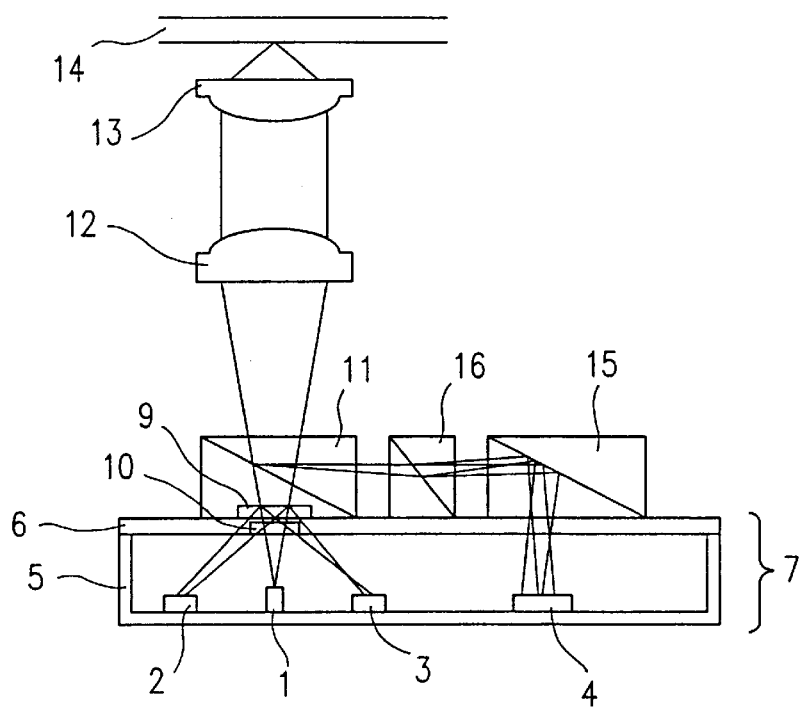
FIG. 5 is a diagram schematically showing a configuration of a fourth modification of the semiconductor laser device of FIG. 1.

As shown in FIG. 5, it is also possible to form the three-beam generating diffraction grating 10 at the top or bottom surface of the seal substrate 6, and form the diffraction grating 9 at the bottom surface of the polarization beam splitter 11. In this case, the number of optical parts can be reduced, whereby reduction in size and thickness of the semiconductor laser device as well as reduction in cost can be achieved.

Figure 6:
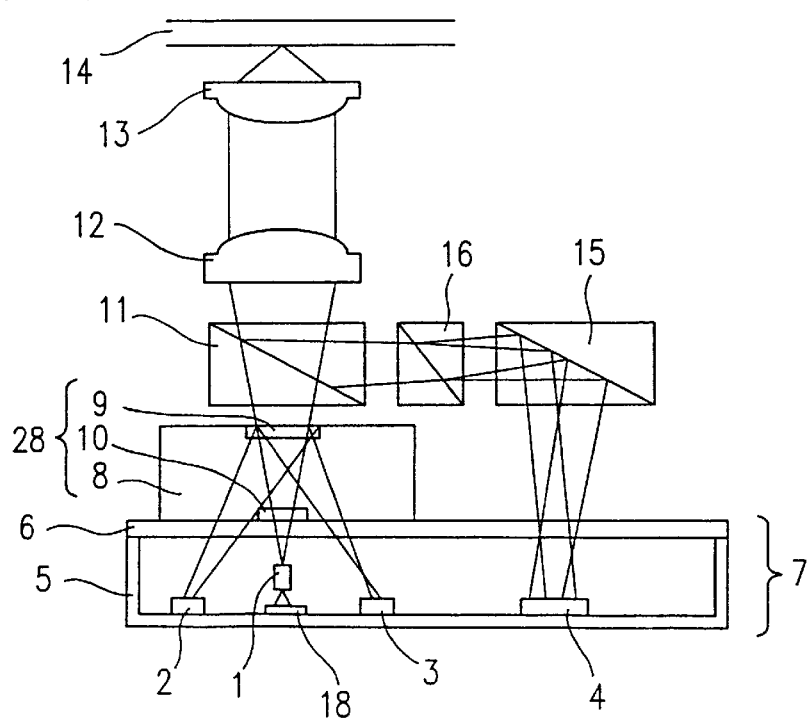
FIG. 6 is a diagram schematically showing a configuration of a fifth modification of the semiconductor laser device of FIG. 1.

As shown in FIG. 6, a light-receiving element 18 for receiving light emitted from the rear emitting end face of the semiconductor laser element 1 for monitoring the light intensity may additionally be provided within the package 5. In this case, the light-receiving element 18 for monitoring the light intensity need not be separately provided outside the package 5, whereby the size and thickness of the semiconductor laser device can further be reduced.

Figure 7:
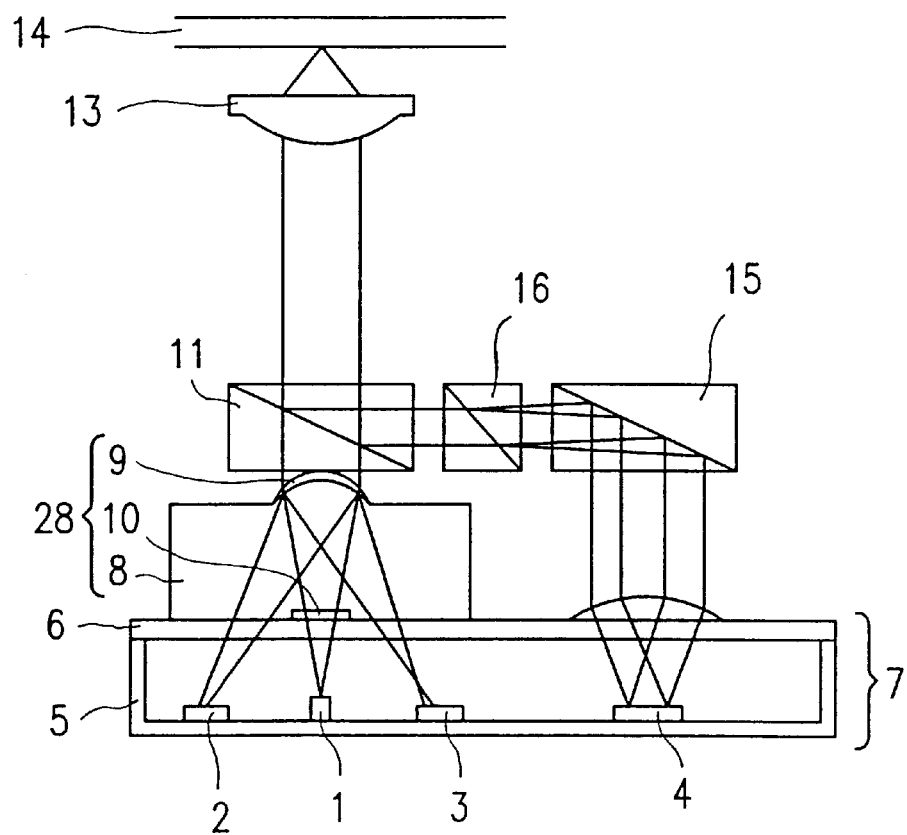
FIG. 7 is a diagram schematically showing a configuration of a sixth modification of the semiconductor laser device of FIG. 1.

As shown in FIG. 7, the hologram optical element 28 may have a curvature at a portion corresponding to the optical path so that a divergent luminous flux from the semiconductor laser element 1 can be changed to a parallel luminous flux. Therefore, the collimator lens 12 can be eliminated, whereby the number of optical parts is reduced. In this case, since the divergent luminous flux from the semiconductor laser element 1 is changed to a parallel luminous flux due to the curvature of the hologram optical element 28, the parallel luminous flux is directed into the polarization beam splitter 11. Therefore, the parallel luminous flux is reflected from the polarization beam splitter 11 through the reflector 15 toward the information-signal light-receiving element 4. However, the seal substrate 6 may have a curvature in a manner similar to that of the hologram optical element 28, whereby convergent light can be directed into the information-signal light-receiving element 4.

An integrated circuit for performing current-to-voltage conversion or an operation of an electric signal(s) from the servo-signal light-receiving element 2, the servo-signal light-receiving element 3 and/or the information-signal light receiving element 4 may be provided within the package 5 in order to reduce an interconnection length. Thus, the S/N ratio and the radio-frequency characteristics can be improved.

Figure 8:
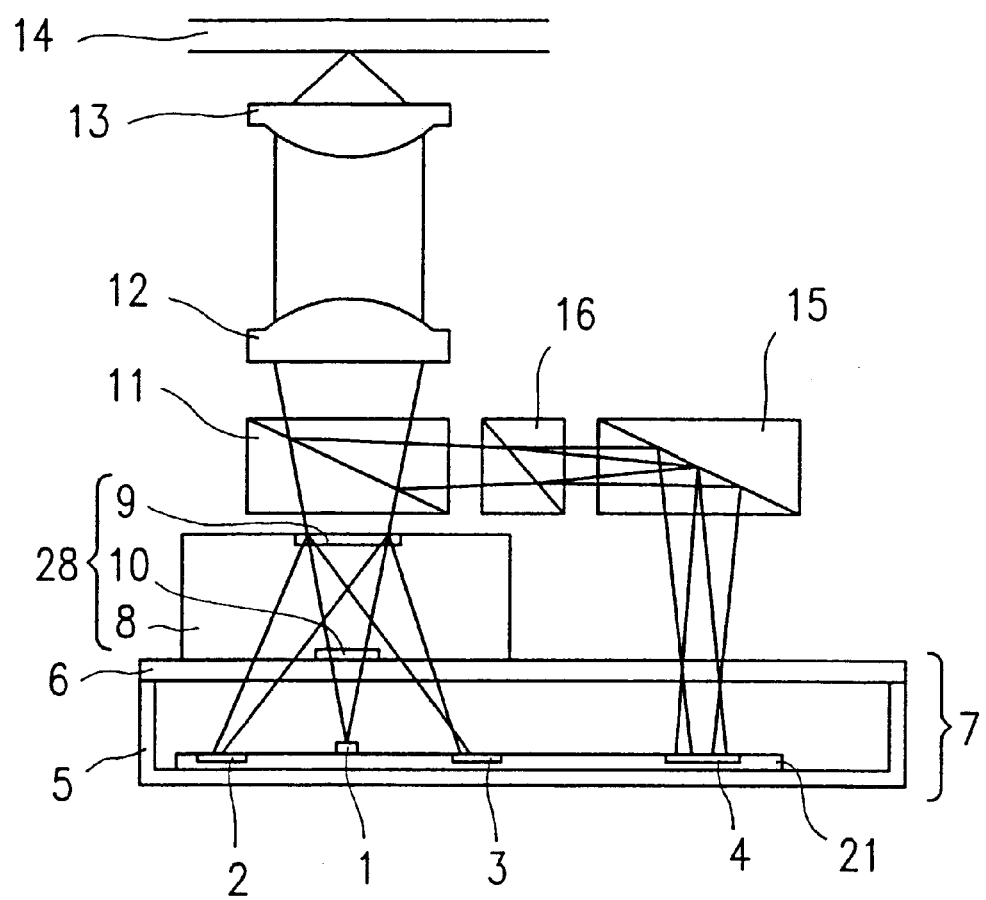
FIG. 8 is a diagram schematically showing a configuration of a seventh modification of the semiconductor laser device of FIG. 1.

Alternatively, the semiconductor laser element 1, the servo-signal light-receiving elements 2 and 3 and the information-signal light-receiving element 4 may be integrated in a single substrate 21, as shown in FIG. 8. In this case, the assembling process can be simplified as compared to the case where each element is individually provided within the package 5. Moreover, a processing technique of the semiconductor processing technology, which provides for smaller components, can be used. By using the semiconductor processing technology, an integrated circuit for performing current-to-voltage conversion or an operation of an electric signal(s) from the light-intensity monitoring light-receiving element 18, the servo-signal light-receiving element 2, the servo-signal light-receiving element 3 and/or the information-signal light-receiving element 4 can also be simultaneously integrated onto the substrate 21. This is realized by forming all of the light-receiving elements on a silicon substrate by the semiconductor processing technology, and chip-bonding the semiconductor laser element 1 in a hybrid manner. Alternatively, a compound semiconductor layer may be formed on the silicon substrate in a monolithic manner by a semiconductor hetero-epitaxial technique, whereby the semiconductor laser element 1, the servo-signal light-receiving elements 2 and 3 and the information-signal light-receiving element 4 are formed on the silicon substrate or the compound semiconductor layer. The semiconductor laser element 1, the servo-signal light-receiving elements 2 and 3 and the information-signal light-receiving element 4 may be integrated in the compound semiconductor layer without using the silicon substrate.

Figure 9:
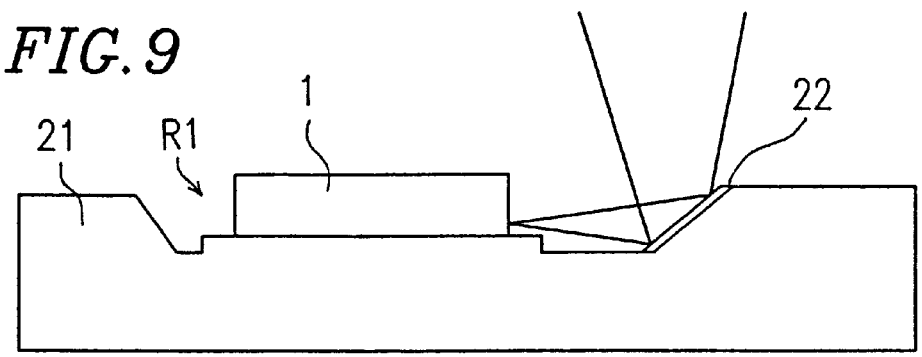
FIG. 9 is a diagram schematically showing a configuration of a semiconductor laser element of the semiconductor laser device of FIG. 1.

For the hybrid integration as described above, in the case where a surface-emitting semiconductor laser is used as a light source, the semiconductor laser element need only be chip-bonded with its emitting face directed upward. Referring to FIG. 9, in the case where an end face-emitting semiconductor laser is used as a light source, a recess R1 is formed in the substrate 21 by the semiconductor processing technology, and the semiconductor laser element 1 is chip-bonded within the recess R1. Then, a face having an angle of about 45° with respect to the upper surface of the substrate 21 is formed in the recess R1, and a film of metal, dielectric or the like is formed on the face by a vapor deposition method, whereby a reflecting mirror 22 is formed. Thus, light emitted from the semiconductor laser element 1 is reflected upward by the reflecting mirror 22, whereby light directed upward can be obtained. It should be noted that the hybrid integration method as shown in FIG. 9 is exemplary only, and other hybrid integration methods may alternatively be used for the end-face-emitting semiconductor laser.

Figure 10:
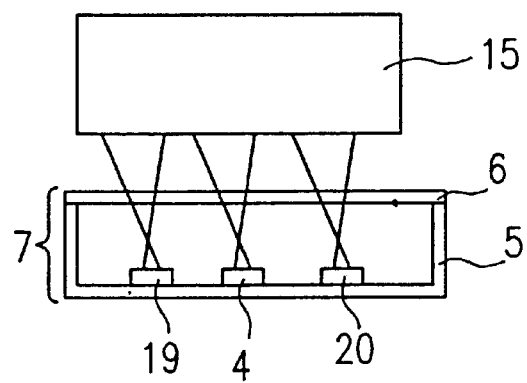
FIG. 10 is a diagram schematically showing a configuration of radial-error-signal light-receiving elements of the semiconductor laser device of FIG. 1.

FIG. 10 is a side view showing radial-error-signal light-receiving elements of the semiconductor laser device. As shown in FIG. 10, negative first-order light and positive first-order light of the three-beam generating diffraction grating 10 may be received by radial-error-signal light-receiving elements 19 and 20, in order to detect a radial error signal.

In the present example, the magneto-optical pick-up for detecting a radial error signal by a three-beam method, and the semiconductor laser device for use in such magneto-optical pick-up are described. However, the present invention can also be applied to the magneto-optical pick-up for detecting a radial error signal by a single-beam method and a semiconductor laser device for use in such magneto-optical pick-up. In this case, the three-beam generating diffraction grating 10 is eliminated, and a radial error signal can be detected by, for example, a single-beam method using a push-pull method. The optic axis of the Wollaston prism 16 may be rotated by 90°. In this case, a plurality of spot positions on the information-signal light-receiving element 4 are rotated by 90° around the center of the information-signal light-receiving element 4. Therefore, the information-signal light-receiving element 4 need only be correspondingly rotated by 90° around the center of the information-signal light-receiving element 4.

Figure 11:
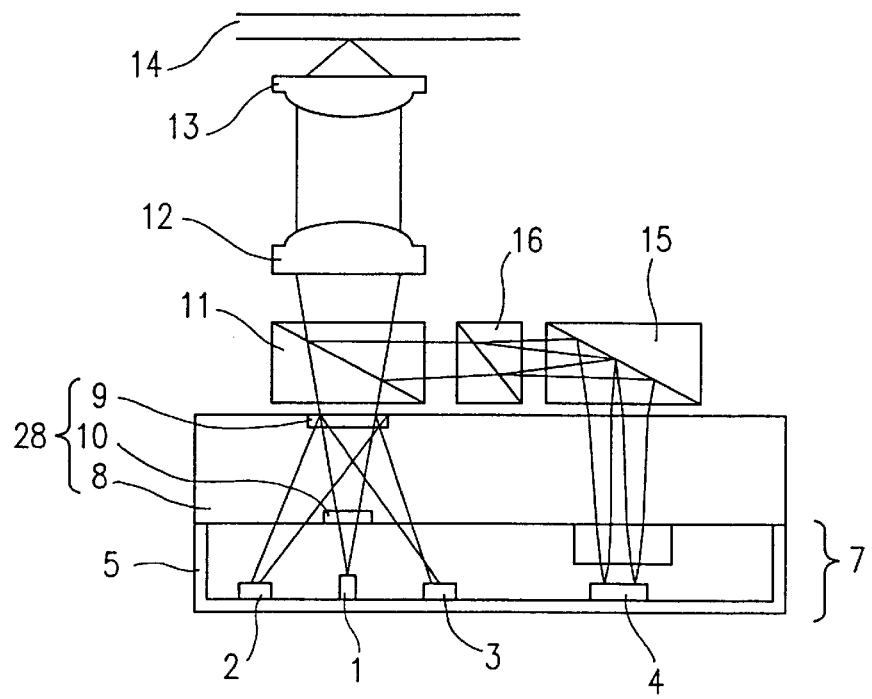
FIG. 11 is a diagram schematically showing a configuration of an eighth modification of the semiconductor laser device of FIG. 1.

As shown in FIG. 11, the seal substrate 6 may be eliminated. Moreover, in the light-transmitting substrate 8, a thickness of a portion through which incident light onto the servo-signal light-receiving elements 2 and 3 is transmitted and a thickness of a portion through which incident light onto the information-signal light-receiving element 4 is transmitted may be set individually. Thus, the focal point of the incident light onto the servo-signal light-receiving elements 2 and 3 and the focal point of the incident light onto the information-signal light-receiving element 4 can be individually adjusted, whereby the size of a light-receiving region of the information-signal light-receiving element 4 can be reduced to about a spot diameter. As a result, the size and thickness of the semiconductor laser device can be reduced. Since the seal substrate 6 is eliminated, the cost of the semiconductor laser device is reduced.

EXAMPLE 2

A semiconductor laser device according to Example 2 of the present invention will now be described.

Figure 12:
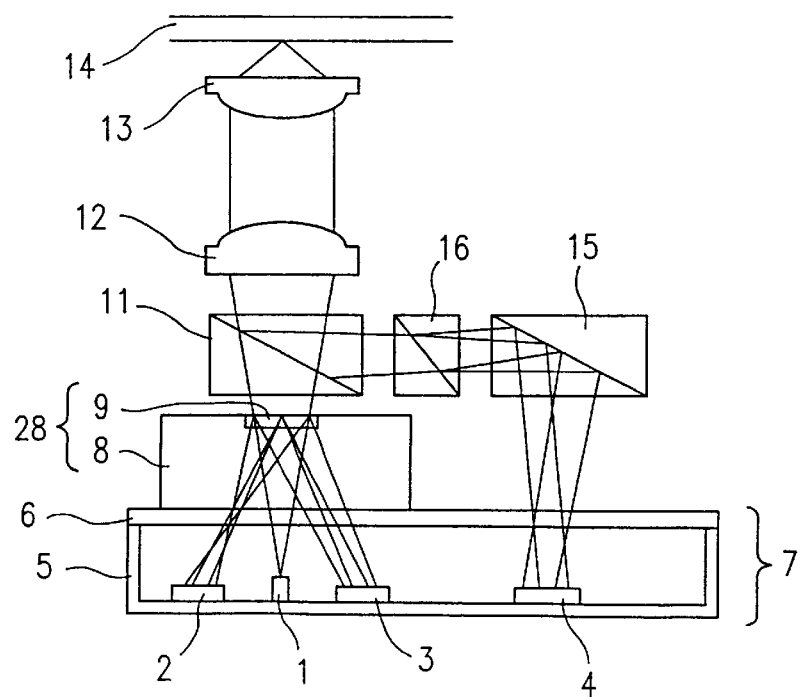
FIG. 12 is a diagram schematically showing a configuration of a semiconductor laser device according to Example 2 of the present invention.
Figure 13:
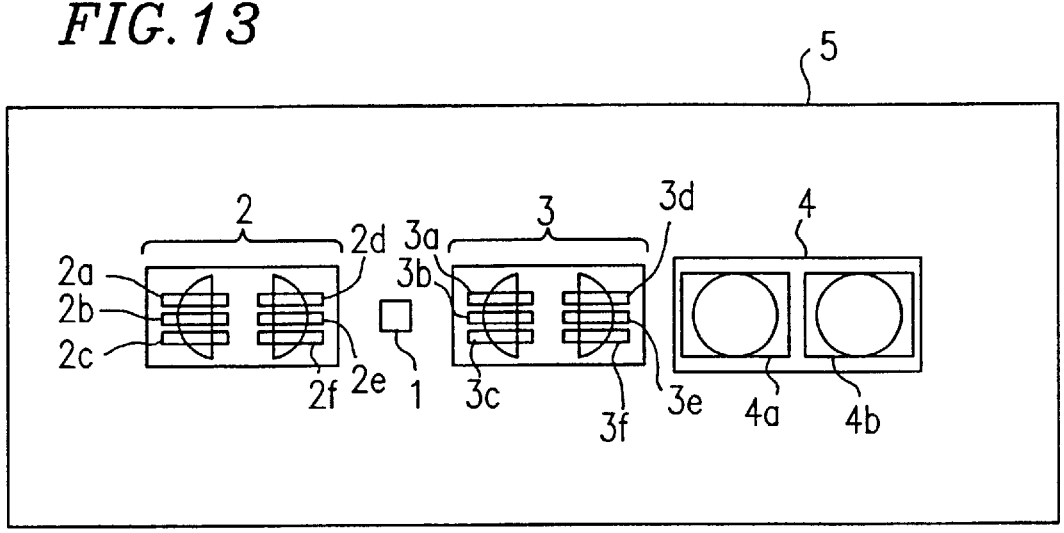
FIG. 13 is a plan view schematically showing a hologram optical element of the semiconductor laser device of FIG. 12.
Figure 14:
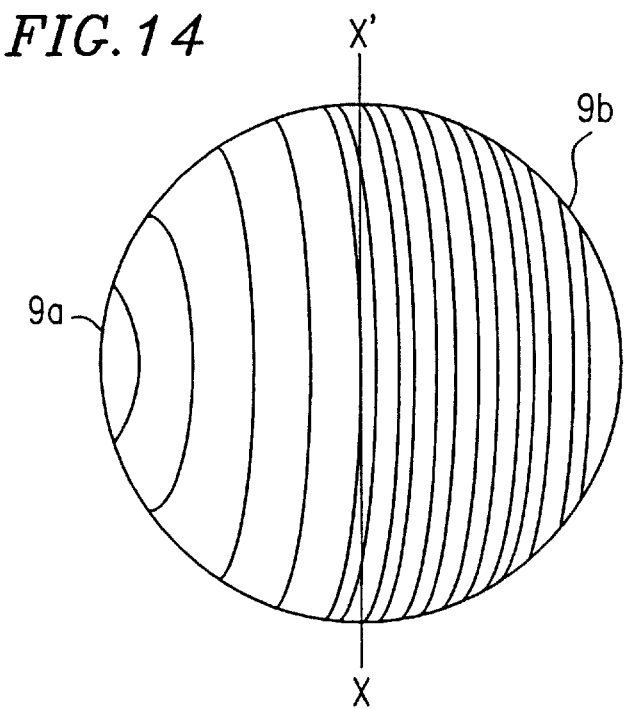
FIG. 14 is a plan view schematically showing a diffraction grating of the semiconductor laser device of FIG. 12.

FIG. 12 is a diagram showing a configuration of the semiconductor laser device according to Example 2. FIG. 13 is a plan view showing a semiconductor laser unit. Referring to FIG. 13, a servo-signal light-receiving element 2 is divided into elements 2a, 2b, 2c, 2d, 2e and 2f, and a servo-signal light-receiving element 3 is divided into elements 3a, 3b, 3c, 3d, 3e and 3f. An information-signal light-receiving element 4 is divided into elements 4a and 4b. It should be noted that the same components as those of the semiconductor laser device of FIG. 1 are denoted by the same reference numerals, and description thereof is omitted in Example 2. The semiconductor laser device shown in FIG. 12 basically has the same configuration as that of the semiconductor laser device shown in FIG. 1. However, the semiconductor laser device of FIG. 12 is different from that of FIG. 1 in that the semiconductor laser device of FIG. 12 detects a radial error signal by a single-beam method, and therefore, does not include the three-beam generating diffraction grating 10, and in that the diffraction grating 9 is divided into two sections 9a and 9b along plane X-X' as shown in FIG. 14. The diffraction grating 9 has different lens effects in the sections 9a and 9b.

Hereinafter, the servo error signal processing will be described with reference to FIGS. 12 through 14. Light emitted from the semiconductor laser element 1 is directed onto the information recording medium 14. The light is reflected by the information recording medium 14 into the objective lens 13, the collimator lens 12, and the polarization beam splitter 11. The polarization beam splitter 11 partially reflects the reflected light, that is return light, into the Wollaston prism 16, while transmitting the remaining light therethrough into the diffraction grating 9. The light incident on the section 9a of the diffraction grating 9 is diffracted, whereby positive first-order diffracted light is directed into the elements 2d, 2e and 2f of the servo-signal light-receiving element 2 and negative first-order diffracted light is directed into the elements 3a, 3b and 3c of the servo-signal light-receiving element 3. Similarly, the light incident on the section 9b of the diffraction grating 9 is diffracted, whereby positive first-order diffracted light is directed into the elements 2a, 2b and 2c of the servo-signal light-receiving element 2 and negative first-order diffracted light is directed into the elements 3d, 3e and 3f of the servo-signal light-receiving element 3. At this time, a focus error signal FoE can be detected by performing the following operation by an SSD method:

$$\text{FoE} = \{(2b+2e)+(3a+3c+3d+3f)\} - \{(3b+3e)+(2a+2c+2d+2f)\}.$$

On the other hand, a radial error signal TE can be obtained by detecting the difference in the quantity of incident light between the sections 9a and 9b of the diffraction grating 9 by performing the following operation:

$$\text{TE} = \{(2d+2e+2f)+(3a+3b+3c)\} - \{(2a+2b+2c)+(3d+3e+3f)\}.$$

It should be noted that the above two equations include reference numerals and characters of the elements such as 2a and 2b. Such reference numerals and characters in the equations represent an intensity of incident light on the corresponding elements. An information-signal is detected by a similar method to that of Example 1.

According to the above-described configuration, the diffraction grating 9 is divided into a plurality of sections having different lens effects. Therefore, the information-signal light-receiving element 4 can be placed at a position to which diffracted light from the plurality of sections of the diffraction grating 9 is not directed. As a result, the semiconductor laser device for magneto-optical pick-up can be reduced in size and thickness while maintaining an excellent S/N ratio. It should be noted that the modifications of Example 1 as shown in FIGS. 2 through 11 can be similarly applied to Example 2.

EXAMPLE 3

Hereinafter, a semiconductor laser device according to Example 3 of the present invention will be described with respect to its configuration and operation.

Figure 15:
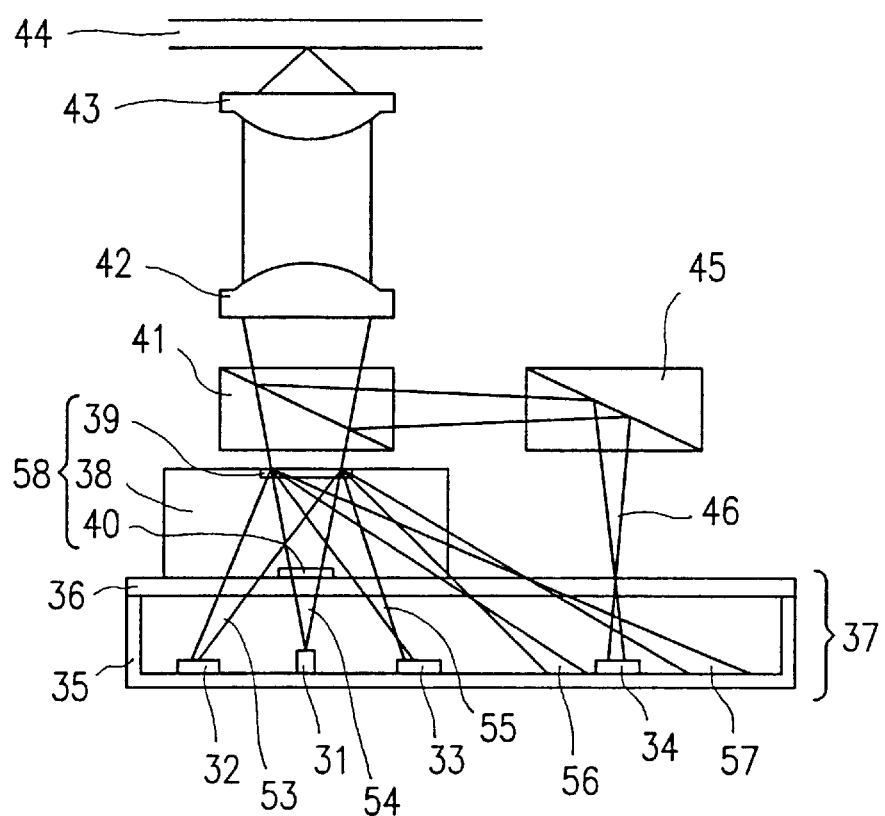
FIG. 15 is a diagram schematically showing a configuration of a semiconductor laser device according to Example of 3 of the present invention.

First, the configuration of the semiconductor laser device of Example 3 will be described. FIG. 15 is a diagram showing the configuration of the semiconductor laser device of Example 3. Referring to FIG. 15, a semiconductor laser element 31, servo-signal light-receiving element 32 and 33 for detecting a radial error signal and a focus error signal, and an information-signal light-receiving element 34 are provided within a single package 35. The package 35 is sealed by a transparent seal substrate 36 which is formed from a material such as glass or resin. Thus, a semiconductor laser unit 37 is formed.

A hologram optical element 58, a beam splitter 41 which serves as beam dividing means, a collimator lens 42 and an objective lens 43 are sequentially provided in this order in the optical path from the semiconductor laser unit 37 to an information recording medium 44 for recording and/or reproducing information. The hologram optical element 58 includes a diffraction grating 39 and a three-beam generating diffraction grating 40. The diffraction grating 39 is formed on a surface of a light transmitting substrate 38 which faces the beam splitter 41. The three-beam generating diffraction grating 40 for dividing incident light into three light beams is formed at the opposite surface of the light transmitting substrate 38 which faces the seal substrate 36. The three-beam generating diffraction grating 40 divides incident light into positive first-order light which is diffracted in the direction perpendicular to the plane of FIG. 15 from the rear to the front of the plane of FIG. 15, 0th-order light which is not diffracted, and negative first-order light which is diffracted in the direction perpendicular to the plane of FIG. 15 from the front to the rear of the plane of FIG. 15. A reflector 45 is provided in the optical path between the reflector 45 and the information-signal light-receiving element 34.

Hereinafter, the operation of the semiconductor laser device according to Example 3 will be described.

Referring to FIG. 15, light emitted from the semiconductor laser element 31 sequentially passes through the hologram optical element 58 and the beam splitter 41 into the collimator lens 42. The collimator lens 42 changes the incident light from a divergent luminous flux to a parallel luminous flux. The parallel light thus obtained passes through the objective lens 43 so as to be focused onto the information recording medium 44. This light is reflected at the surface of the information recording medium 44. Then, the reflected light, i.e., return light sequentially passes through the objective lens 43 and the collimator lens 42 into the beam splitter 41. The beam splitter 41 partially reflects the return light into the reflector 45, while transmitting the remaining return light therethrough into the hologram optical element 58. The light directed into the hologram optical element 58 is diffracted by the diffraction grating 39. For simplicity, diffracted light other than negative first-order diffracted light 53, 0th-order diffracted light 54, positive first-order diffracted light 55, positive second-order diffracted light 56 and positive third-order diffracted light 57 is omitted in FIG. 15. A focus error signal is detected by an SSD method using the negative first-order diffracted light 53 and the positive first-order diffracted light 55, whereas a radial error signal is detected by a differential detection method using a three-beam method using the negative first-order diffracted light 53 and the positive first-order diffracted light 55. The information-signal light-receiving element 34 is located between the respective optical paths of the positive second-order diffracted light 56 and the positive third-order diffracted light 57. Therefore, the information-signal light-receiving element 34 does not directly receive diffracted light from the diffraction grating 39.

Figure 16:
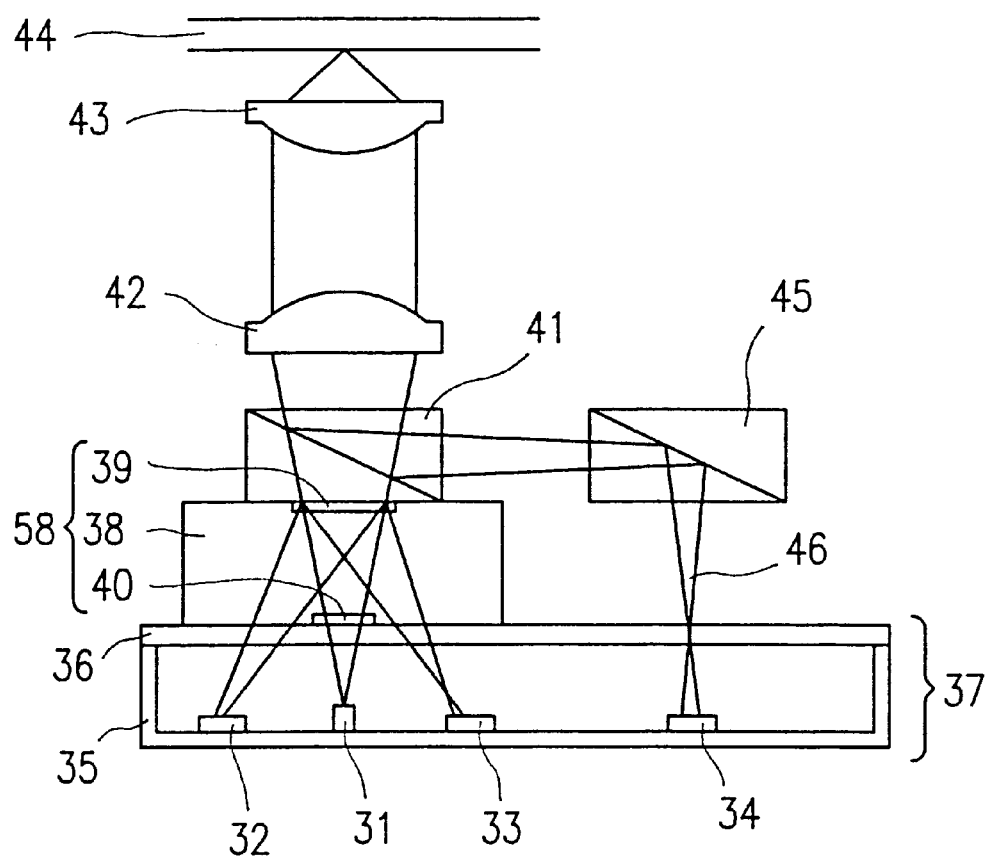
FIG. 16 is a diagram schematically showing a configuration of a first modification of the semiconductor laser device of FIG. 15.

It should be noted that, for simplicity, diffracted light other than the negative first-order diffracted light 53, the 0th-order diffracted light 54 and the positive first-order diffracted light 55 is omitted in FIG. 16 and the figure following FIG. 16.

As described above, the beam splitter 412 partially reflects the return light into the reflector 45. At this time, the light reflected by the beam splitter 41 is reflected by the reflector 45 into the information-signal light-receiving element 34 so as to be used as an information signal.

Thus, according to the present example, the information-signal light-omitting element 34 is provided within the package 35 so as to be located outside each optical path of the diffracted light from the diffraction grating 39. As a result, the semiconductor laser device having an excellent S/N ratio can be produced without increasing the size thereof.

According to the present example described above, the semiconductor laser device has an optical system including the collimator lens 42 and the objective lens 43. However, the semiconductor laser device of the present invention may alternatively have an optical system including only the objective lens 43. In this case, the objective lens 43 is interposed between the semiconductor laser element 31 and the information recording medium 44 such that the semiconductor laser element 31 and the information recording medium 44 are located at the focal points on both sides of the objective lens 43, respectively.

Figure 17:
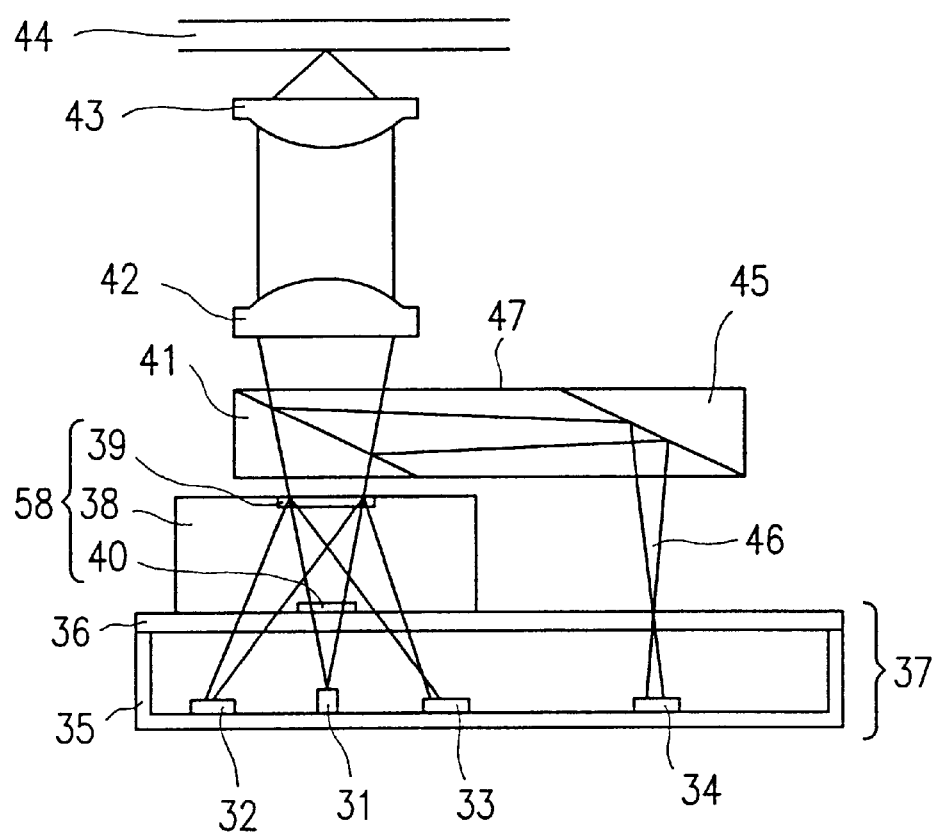
FIG. 17 is a diagram schematically showing a configuration of a second modification of the semiconductor laser device of FIG. 15.
Figure 18:
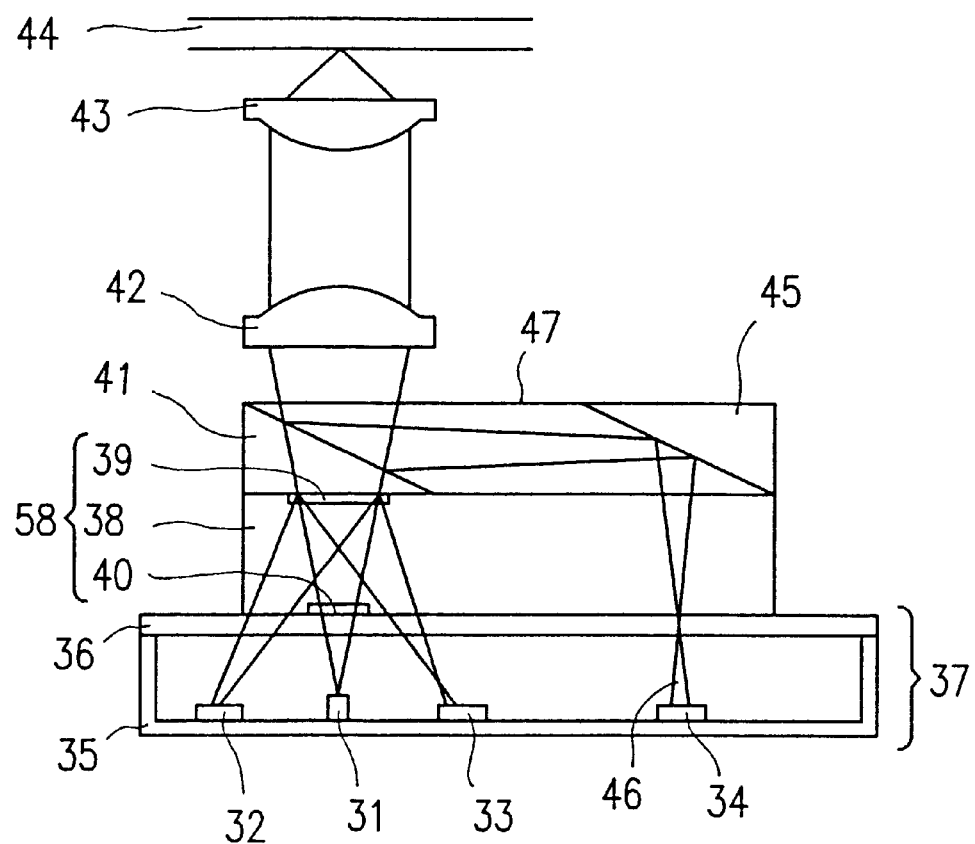
FIG. 18 is a diagram schematically showing a configuration of a third modification of the semiconductor laser device of FIG. 15.

According to the present example, a plurality of optical parts may be integrated. For example, the beam splitter 41 may be integrated onto the hologram optical element 58, as shown in FIG. 16. Alternatively, as shown in FIG. 17, the beam splitter 41 and the reflector 45 may be integrated into a complex prism 47. Alternatively, as shown in FIG. 18, the hologram optical element 58 may be integrated onto the seal substrate 36, and the complex prism 47 may further be integrated thereon. Thus, a plurality of optical parts are integrated, whereby the size and thickness of the semiconductor laser device can further be reduced.

The reflector 45 may be formed by a total-reflecting mirror. In this case, light for the information signal is entirely directed into the information-signal light-receiving element 34. As a result, light is more efficiently utilized, whereby the S/N ratio is improved.

Figure 19:
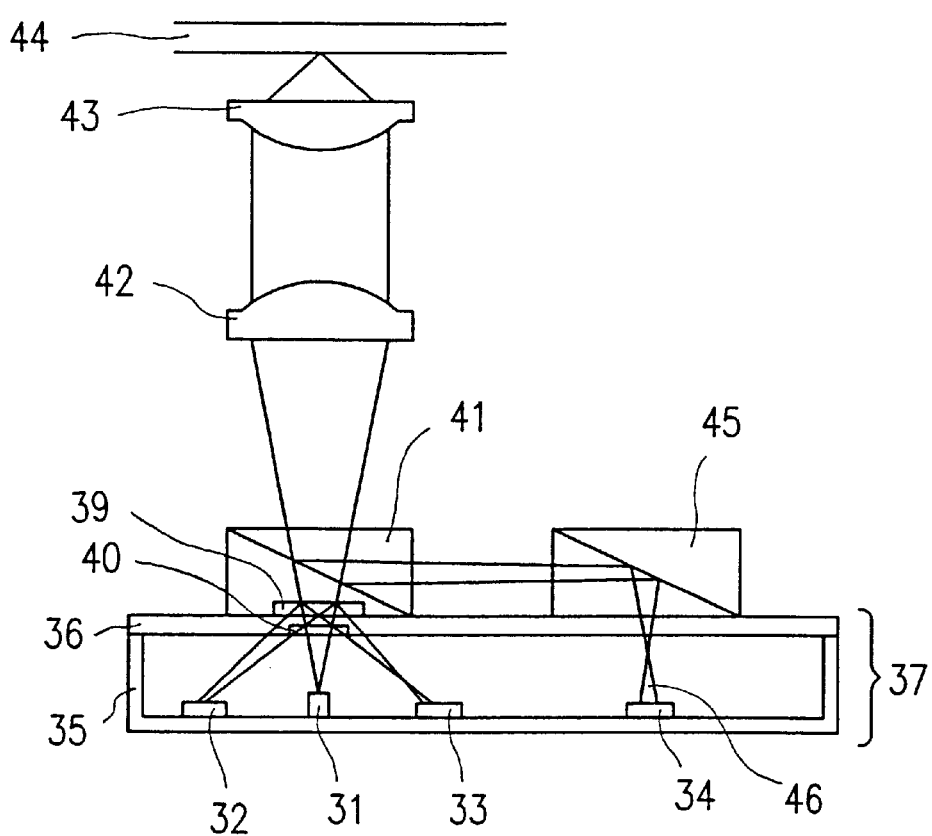
FIG. 19 is a diagram schematically showing a configuration of a fourth modification of the semiconductor laser device of FIG. 15.

It is also possible to form the three-beam generating diffraction grating 40 at the top or bottom surface of the seal substrate 36, and form the diffraction grating 39 at the bottom surface of the beam splitter 41, as shown in FIG. 19. In this case, the number of optical parts is reduced, whereby reduction in size and thickness of the semiconductor laser device as well as reduction in cost can be achieved.

Figure 20:
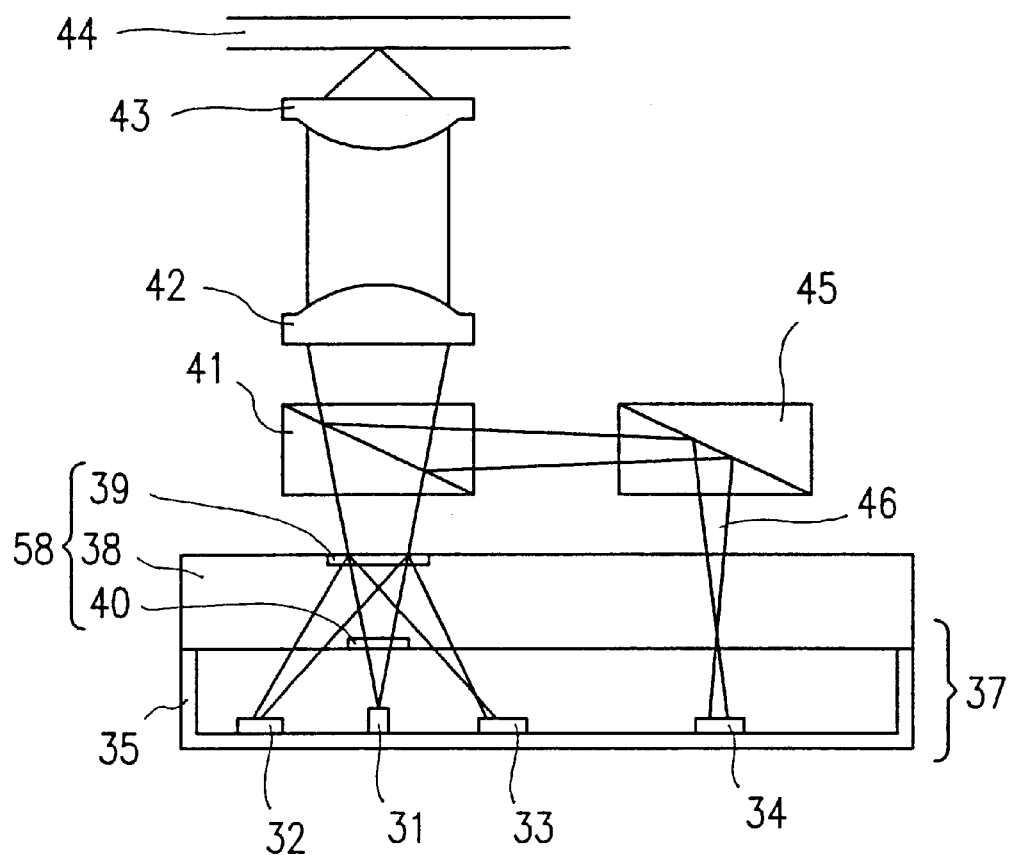
FIG. 20 is a diagram schematically showing a configuration of a fifth modification of the semiconductor laser device of FIG. 15.

The package 35 may be sealed by the hologram optical element 58 instead of the light transmitting substrate 38, as shown in FIG. 20. In this case, the seal substrate 36 is not necessary. Therefore, the number of optical parts can be reduced without degrading the durability and reliability of the semiconductor laser device.

Figure 21:
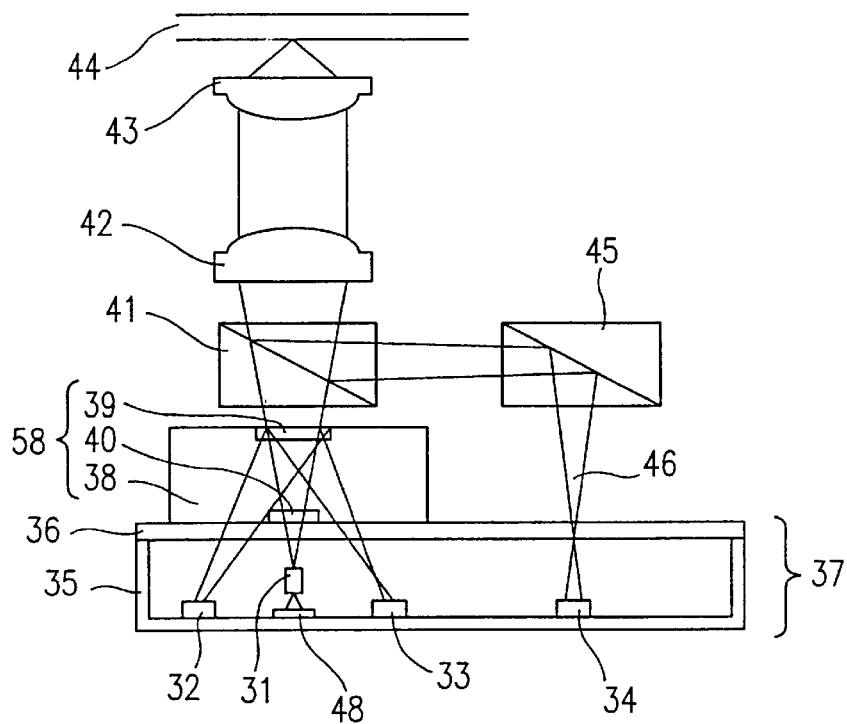
FIG. 21 is a diagram schematically showing a configuration of a sixth modification of the semiconductor laser device of FIG. 15.

As shown in FIG. 21, a light-receiving element 48 for receiving light emitted from the rear emitting end face of the semiconductor laser element 31 for monitoring the light intensity may additionally be provided within the package 35. In this case, the light-receiving element 48 for monitoring the light intensity need not be separately provided outside the package 35, whereby the size and thickness of the semiconductor laser device can further be reduced.

Figure 22:
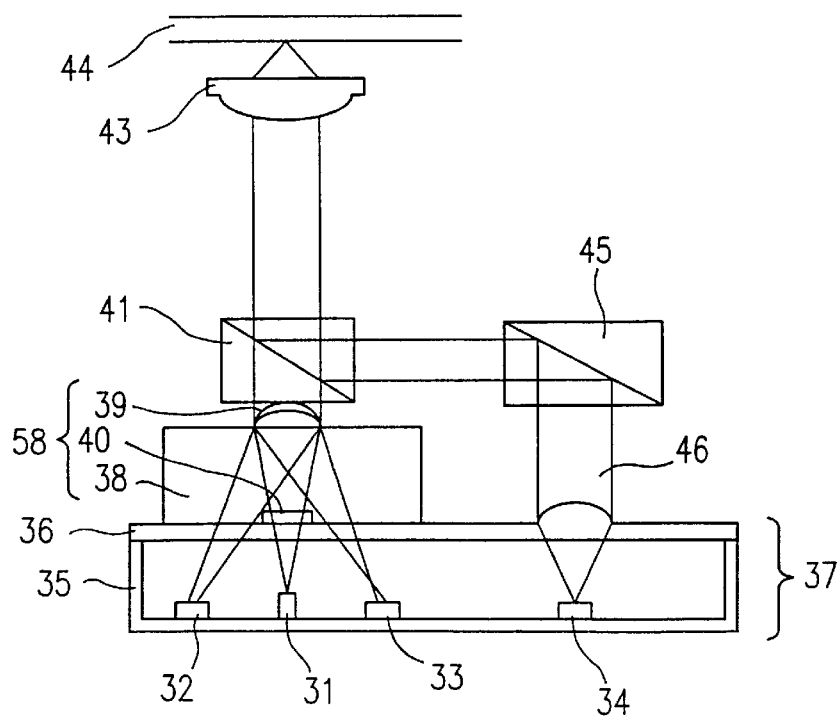
FIG. 22 is a diagram schematically showing a configuration of a seventh modification of the semiconductor laser device of FIG. 15.

As shown in FIG. 22, the hologram optical element 58 may have a curvature at a portion corresponding to the optical path so that a divergent luminous flux from the semiconductor laser element 31 can be changed to a parallel luminous flux. Therefore, the collimator lens 42 can be eliminated, whereby the number of optical parts is reduced. In this case, since the divergent luminous flux from the semiconductor laser element 31 is changed to a parallel luminous flux due to the curvature of the hologram optical element 58, the parallel luminous flux is directed into the beam splitter 41. Therefore, the parallel luminous flux is reflected from the beam splitter 41 through the reflector 45 toward the information-signal light-receiving element 34. The seal substrate 36 may also have a curvature similar to that of the hologram optical element 58, whereby convergent light can be directed into the information-signal light-receiving element 34.

An integrated circuit for performing current-to-voltage conversion or an operation of an electric signal(s) from the servo-signal light-receiving element 32, the servo-signal light-receiving element 33 and/or the information-signal light receiving element 34 may be provided within the package 35 in order to reduce an interconnection length. Thus, the S/N ratio and the radio-frequency characteristics can be improved.

Figure 23:
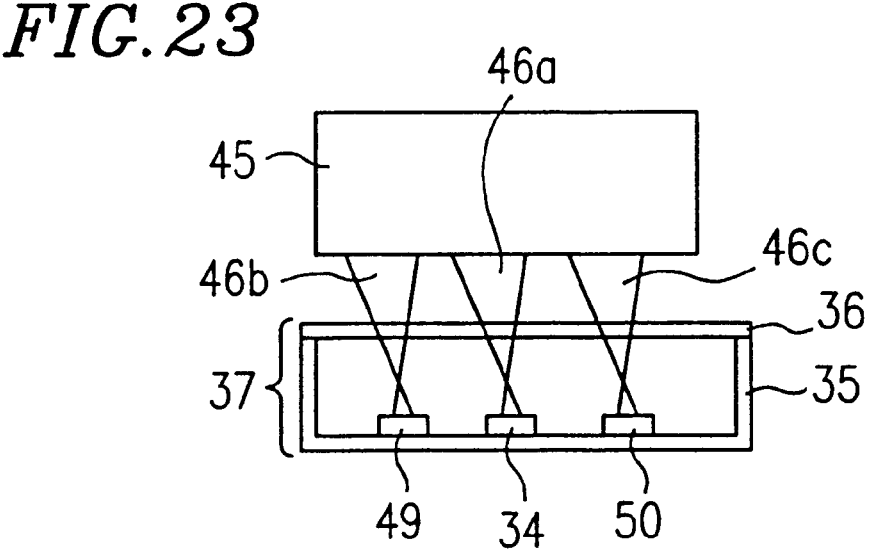
FIG. 23 is a diagram schematically showing a configuration of radial error signal light-receiving elements of the semiconductor laser of FIG. 15.

FIG. 23 is a side view showing radial-error-signal light-receiving elements of the semiconductor laser device. As shown in FIG. 23, negative first-order light 46b and positive first-order light 46c from the three-beam generating diffraction grating 40 (FIG. 22) may be received by radial-error-signal light-receiving elements 49 and 50, respectively, in order to detect a radial error signal. In this case, 0th-order light 46a may be received by the information-signal light-receiving element 34. It should be noted that, in this case, a sub-beam diffracted by the diffraction grating 39 is not used as a radial error detection signal. Alternatively, a single light-receiving element, which is divided into three elements used as the radial-error-signal light-receiving elements 49 and 50 and the information-signal light-receiving element 34, may be used. In such a case, the number of light-receiving elements is reduced, whereby the cost of the semiconductor laser device can be reduced.

The three-beam generating diffraction grating 40 may be eliminated, whereby a radial error signal may be detected by, for example, a single-beam method using a push-pull method. In this case, light emitted from the semiconductor laser element 31 is not divided into three beams, whereby the quantity of light 46 for the information signal is increased. As a result, the S/N ratio is further improved.

Figure 24:
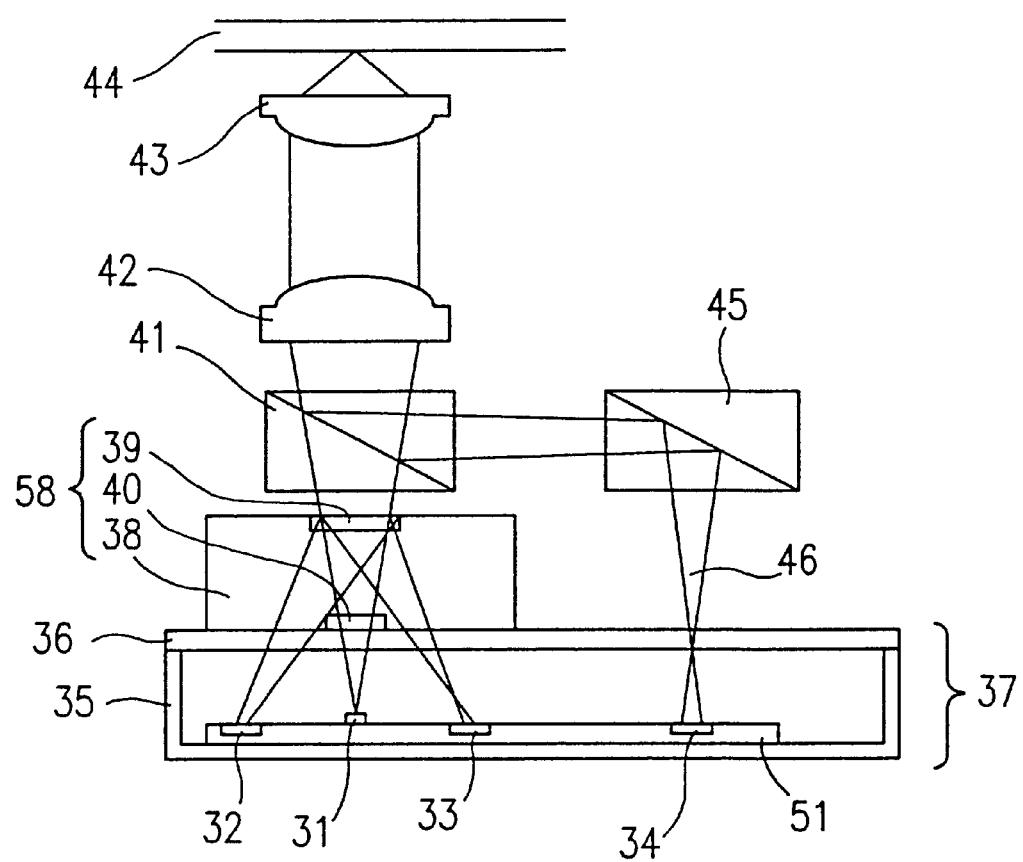
FIG. 24 is a diagram schematically showing a configuration of an eighth modification of the semiconductor laser device of FIG. 15.

Alternatively, the semiconductor laser element 31, the servo-signal light-receiving elements 32 and 33 and the information-signal light-receiving element 34 may be integrated in a single substrate 51, as shown in FIG. 24. In this case, the assembling process can be simplified as compared to the case where each element is individually provided within the package 35. Moreover, a fine-processing technique of the semiconductor processing technology can be used. By using the semiconductor processing technology, an integrated circuit for performing current-to-voltage conversion or an operation of an electric signal(s) from the light-intensity monitoring light-receiving element 48 (FIG. 21), the servo-signal light-receiving element 32, the servo-signal light-receiving element 33 and/or the information-signal light-receiving element 34 can also be simultaneously integrated onto the substrate 51. This is realized by forming all of the light-receiving elements at a silicon substrate by the semiconductor processing technology, and chip-bonding the semiconductor laser element 31 in a hybrid manner. Alternatively, a compound semiconductor layer may be formed on the silicon substrate in a monolithic manner by a semiconductor hetero-epitaxial technique, whereby the semiconductor laser element 31, the servo-signal light-receiving elements 32 and 33 and the information-signal light-receiving element 34 are formed at the silicon substrate or the compound semiconductor layer. The semiconductor laser element 31, the servo-signal light-receiving elements 32 and 33 and the information-signal light-receiving element 34 may be integrated in the compound semiconductor layer without using the silicon substrate.

Figure 25:
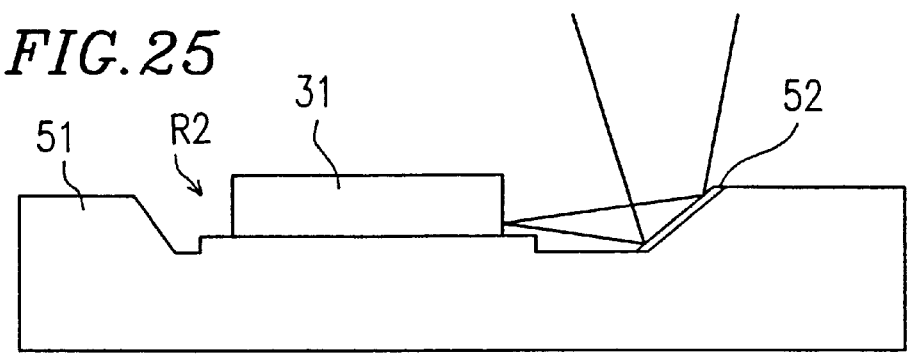
FIG. 25 is a diagram schematically showing a semiconductor laser element of the semiconductor laser device of FIG. 15.

For the hybrid integration as described above, in the case where a surface-emitting semiconductor laser is used as a light source, the semiconductor laser element need only be chip-bonded with its emitting face upward. Referring to FIG. 25, in the case where an end face-emitting semiconductor laser is used as a light source, a recess R2 is formed in the substrate 51 by the semiconductor processing technology, and the semiconductor laser element 31 is chip-bonded within the recess R2. Then, a face having an angle of about 45° with respect to the upper surface of the substrate 51 is formed in the recess R2, and a film of metal, dielectric or the like is formed on the face by a vapor deposition method, whereby a reflecting mirror 52 is formed. Thus, light emitted from the semiconductor laser element 31 is reflected upward by the reflecting mirror 52, whereby light directed upward can be obtained. It should be noted that the hybrid integration method as shown in FIG. 25 is exemplary only, and other hybrid integration methods may alternatively be used for the end-face-emitting semiconductor laser.

Figure 26:
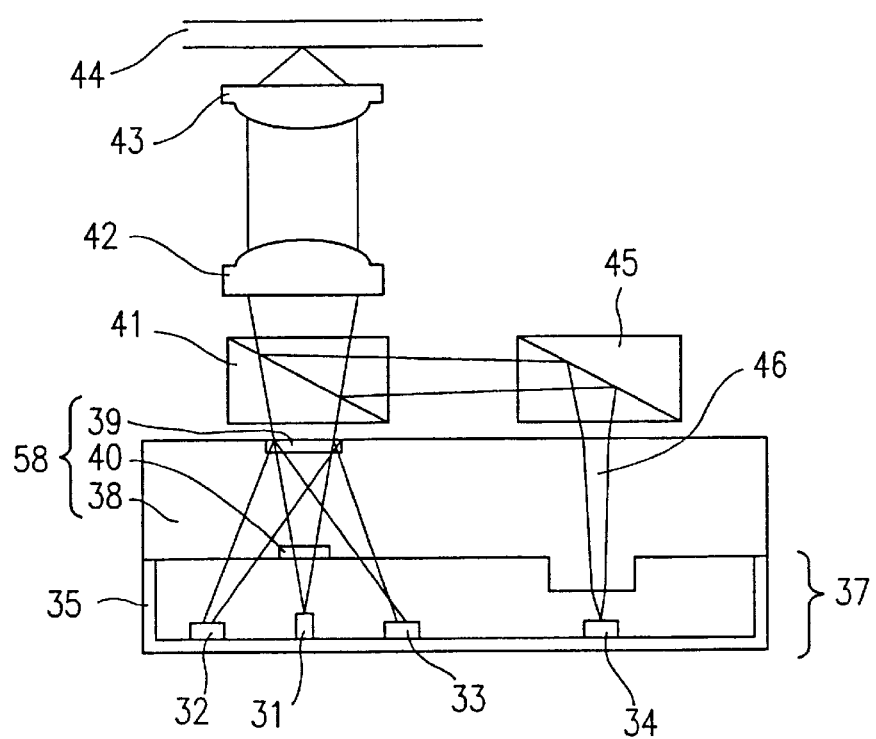
FIG. 26 is a diagram schematically showing a configuration of a ninth modification of the semiconductor laser device of FIG. 15.

As shown in FIG. 26, the seal substrate 36 may be eliminated. Moreover, in the light-transmitting substrate 38, a thickness of a portion through which incident light onto the servo-signal light-receiving elements 32 and 33 is transmitted and a thickness of a portion through which incident light onto the information-signal light-receiving element 34 may be set individually. Thus, the focal point of the incident light onto the servo-signal light-receiving elements 32 and 33 and the focal point of the incident light onto the information-signal light-receiving element 34 can be individually adjusted, whereby the size of a light-receiving region of the information-signal light-receiving element 34 can be reduced to about a spot diameter. As a result, the size and thickness of the semiconductor laser device can be reduced. Since the seal substrate 36 is eliminated, the cost of the semiconductor laser device is reduced.

EXAMPLE 4

A semiconductor laser device according to Example 4 of the present invention will now be described.

Figure 27:
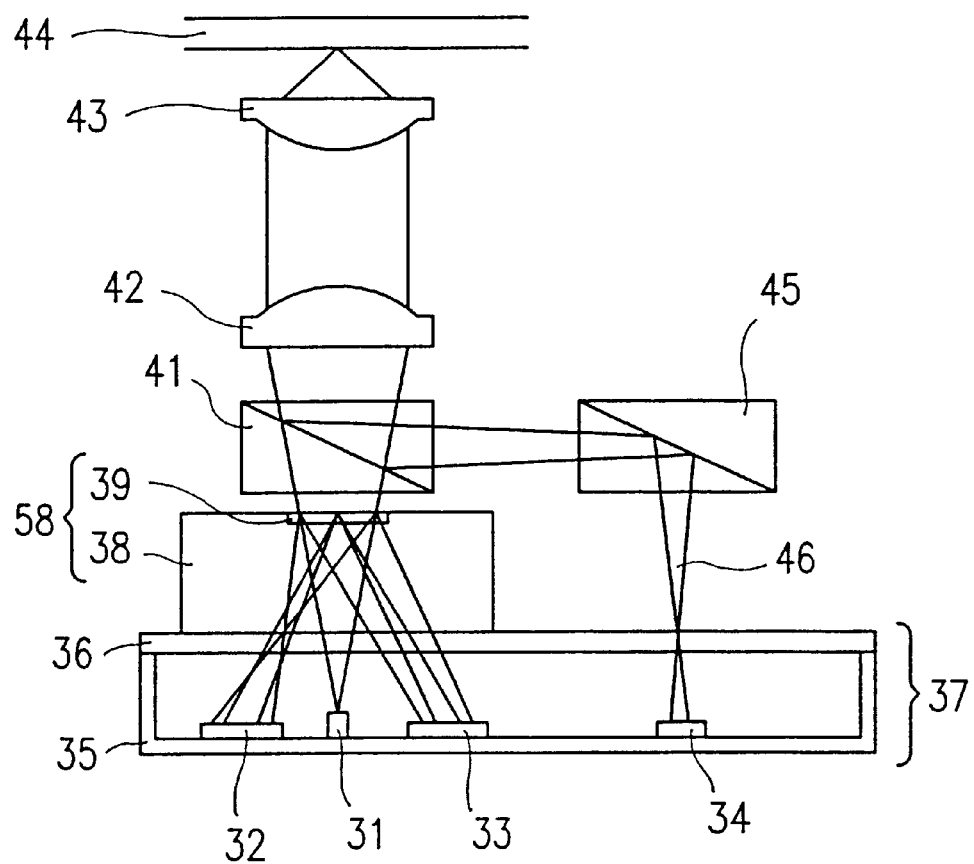
FIG. 27 is a diagram schematically showing a configuration of a semiconductor laser device according to Example 4 of the present invention.
Figure 28:
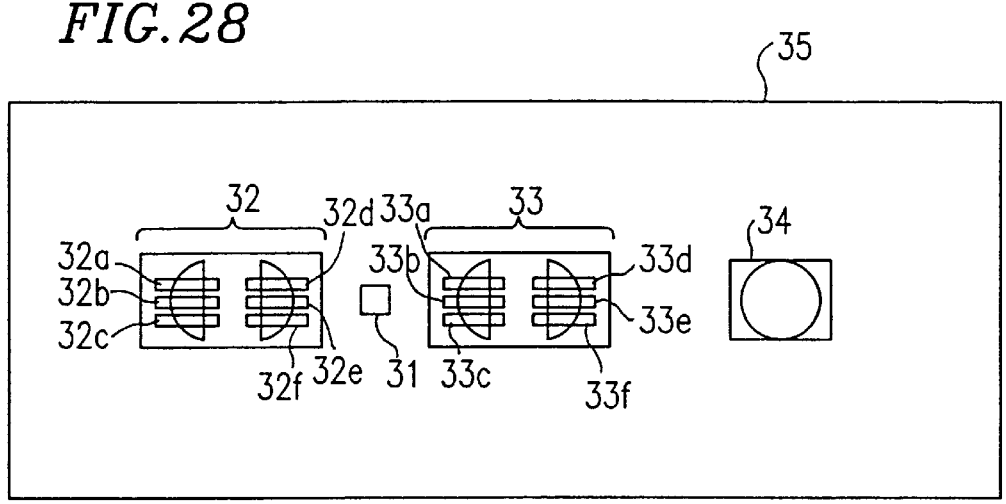
FIG. 28 is a plan view schematically showing a semiconductor laser unit of the semiconductor laser device of FIG. 27.
Figure 29:
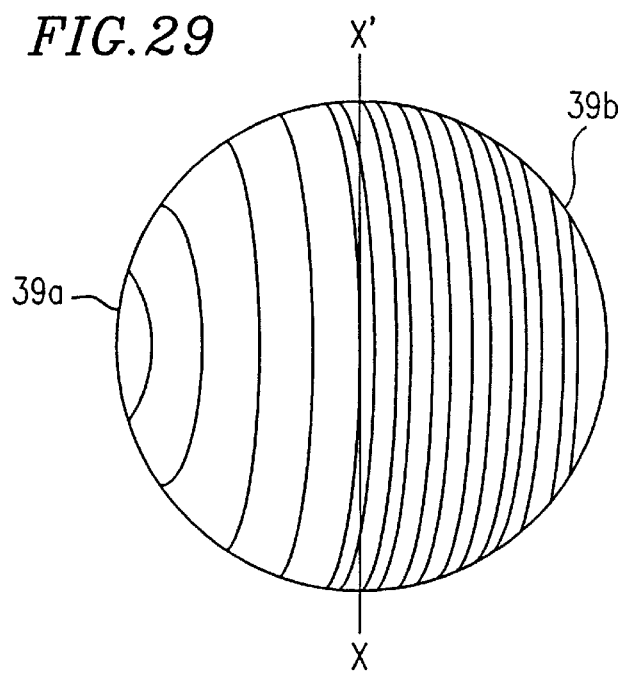
FIG. 29 is a plan view schematically showing a diffraction grating of the semiconductor laser device of FIG. 27.
Figure 30:
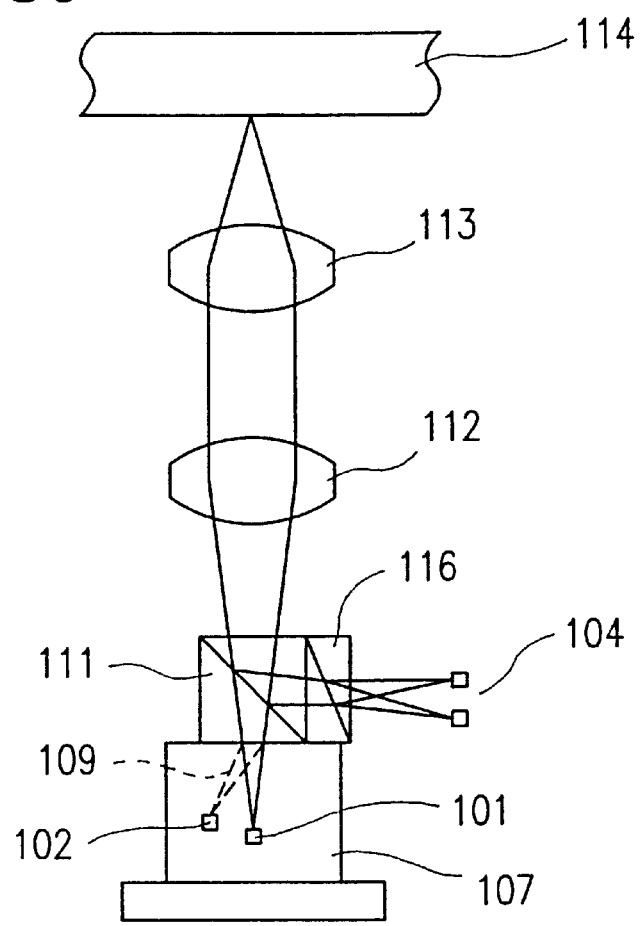
FIG. 30 is a diagram schematically showing a configuration of a conventional semiconductor laser device.
Figure 31:
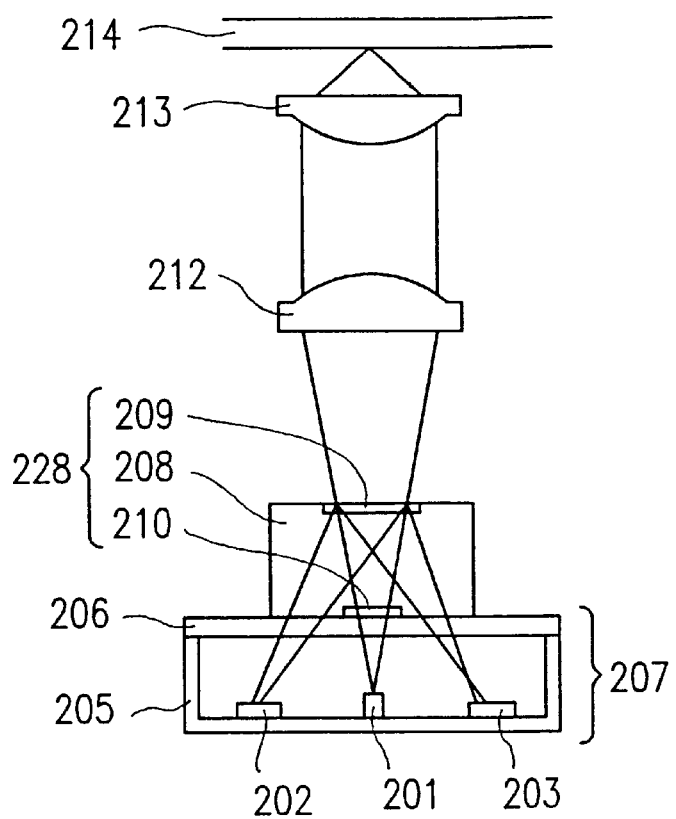
FIG. 31 is a diagram schematically showing a configuration of another conventional semiconductor laser device.

FIG. 27 is a diagram showing a configuration of the semiconductor laser device according to Example 4. FIG. 28 is a plan view showing a semiconductor laser unit. Referring to FIG. 28, a servo-signal light-receiving element 32 is divided into elements 32a, 32b, 32c, 32d, 32e and 32f, and a servo-signal light-receiving element 33 is divided into elements 33a, 33b, 33c, 33d, 33e and 33f. It should be noted that the same components as those of the semiconductor laser device of FIG. 15 are denoted by the same reference numerals, and description thereof is omitted in Example 4. The semiconductor laser device shown in FIG. 27 basically has the same configuration as that of the semiconductor laser device shown in FIG. 15. However, the semiconductor laser device of FIG. 27 is different from that of FIG. 15 in that the semiconductor laser device of FIG. 27 detects a radial error signal by a single-beam method, and therefore, does not include the three-beam generating diffraction grating 40, and in that the diffraction grating 39 is divided into two sections 39a and 39b along plane X-X' as shown in FIG. 29. The diffraction grating 39 has different lens effects in the sections 39a and 39b.

Hereinafter, the servo error signal processing will be described with reference to FIGS. 27 through 29. Light emitted from the semiconductor laser element 31 is directed onto an information recording medium 44. The light is reflected by the information recording medium 44 into the objective lens 43, the collimator lens 42 and the beam splitter 41. The beam splitter 41 partially reflects the reflected light, that is return light, into the reflector 45, while transmitting the remaining light therethrough into the diffraction grating 39. The light incident into the section 39a of the diffraction grating 39 is diffracted, whereby positive first-order diffracted light is directed into the elements 32d, 32e and 32f of the servo-signal light-receiving element 32 and negative first-order diffracted light is directed into the elements 33a, 33b and 33c of the servo-signal light-receiving element 33. Similarly, the light incident into the section 39b of the diffraction grating 39 is diffracted, whereby positive first-order diffracted light is directed into the elements 32a, 32b and 32c of the servo-light receiving element 32 and negative first-order diffracted light is directed into the elements 33d, 33e and 33f of the servo-signal light-receiving element 33. At this time, a focus error signal FoE can be detected by performing the following operation by an SSD method:

$$FoE=\{(32b+32e)+(33a+33c+33d+33f)\}-\{(33b+33e)+(32a+32c+32d+32f)\}.$$

On the other hand, a radial error signal TE can be obtained by detecting a difference in the quantity of incident light between the sections 39a and 39b of the diffraction grating 39 by performing the following operation:

$$TE=\{(32d+32e+32f)+(33a+33b+33c)\}-\{(32a+32b+32c)+(33d+33e+33f)\}.$$

It should be noted that, the above two equations include reference numerals and characters of the elements such as 32a and 32b. Such reference numerals and characters in the equations represent an intensity of incident light onto the corresponding elements. An information signal is detected by a similar method to that of Example 1.

According to the above-described configuration, the diffraction grating 39 is divided into a plurality of sections having different lens effects. Therefore, the information-signal light-receiving element 34 can be placed at a position to which diffracted light from the plurality of sections of the diffraction grating 39 is not directed. As a result, the semiconductor laser device for magneto-optical pick-up can be reduced in size and thickness while maintaining an excellent S/N ratio. It should be noted that the modifications of Example 3 as shown in FIGS. 16 through 26 can be similarly applied to Example 4.

As has been described above, according to the present invention, the semiconductor laser element, the servo-signal light-receiving elements and the information-signal light-receiving element are accommodated within a single package, whereby the size and thickness of the semiconductor laser device can be reduced.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A semiconductor laser device, comprising:
    a semiconductor laser element for emitting laser light onto a recording medium;
    beam dividing means provided in an optical path between the semiconductor laser element and the recording medium;
    a hologram optical element including a diffraction grating formed in a light-transmitting substrate, the hologram optical element located in an optical path between the beam dividing means and the semiconductor laser element;
    a servo-signal light-receiving element provided in an optical path of diffracted light transmitted through the diffraction grating for receiving the diffracted light;
    an information-signal light-receiving element for receiving light divided by the beam-dividing means, which is different from light divided by the beam-dividing means which is received by the diffraction grating; and
    a polarizing element provided in an optical path between the beam dividing means and the information-signal light-receiving element, wherein
        the semiconductor laser element, the servo-signal light-receiving element and the information-signal light-receiving element are provided within a single package, and the hologram optical element is provided on the single package, and
        the information-signal light-receiving element is provided outside an optical path of every order of diffracted light transmitted through the diffraction grating.

2. A semiconductor laser device according to claim 1, wherein reflecting means is provided in the optical path between the beam dividing means and the information-signal light-receiving element.

3. A semiconductor laser device according to claim 2, wherein the polarizing element and the reflecting means are integrally formed such that the polarizing element is located between the hologram optical element and the reflecting means, and a base of the hologram optical element having a height larger than a thickness of the polarization element is provided at the hologram optical element.

4. A semiconductor laser device according to claim 1, wherein the diffraction grating is divided into a plurality of sections.

5. A semiconductor laser device according to claim 4, wherein each of the sections have a different lens effect.

6. A semiconductor laser device according to claim 1, wherein the hologram optical element has a lens effect for collimating laser light emitted from the semiconductor laser element.

7. A semiconductor laser device according to claim 1, wherein
    in the light-transmitting substrate, a thickness of a portion of the light transmitting substrate through which incident light onto the servo-signal light-receiving element is transmitted, and a thickness of a portion of the light-transmitting substrate through which incident light onto the information-signal light-receiving element is transmitted may be individually set, whereby a focal point of the incident light onto the servo-signal light-receiving element and a focal point of the incident light onto the information-signal light-receiving element are individually adjusted.

8. A semiconductor laser device according to claim 1, wherein the package is sealed by the hologram optical element.

9. A semiconductor laser device according to claim 1, wherein said semiconductor laser element and said servo-signal light-receiving element are shielded.

10. A semiconductor laser device according to claim 1, wherein said diffraction grating is formed on a bottom plane of said hologram optical element.

11. A semiconductor laser device according to claim 1, wherein said polarizing element is a Wollaston prism.

12. A semiconductor laser device, comprising:

a semiconductor laser element for emitting laser light onto a recording medium;

beam dividing means provided in an optical path between the semiconductor laser element and the recording medium;

a hologram optical element including a diffraction grating formed in a light-transmitting substrate, the hologram optical element located in an optical path between the beam dividing means and the semiconductor laser element;

a servo-signal light-receiving element provided in an optical path of diffracted light transmitted through the diffraction grating for receiving the diffracted light; and an information-signal light-receiving element for receiving light divided by the beam-dividing means, which is different from light divided by the beam-dividing means which is received by the diffraction grating, wherein the semiconductor laser element, the servo-signal light-receiving element and the information-signal light-receiving element are provided within a single package, and the hologram optical element is provided on the single package, and the information-signal light-receiving element is provided outside an optical path of every order of diffracted light transmitted through the diffraction grating.

13. A semiconductor laser device according to claim 12, wherein reflecting means is provided in the optical path between the beam dividing means and the information-signal light-receiving element.

14. A semiconductor laser device according to claim 12, wherein the diffraction grating is divided into a plurality of sections.

15. A semiconductor laser device according to claim 14, wherein each of the sections have a different lens effect.

16. A semiconductor laser device according to claim 12, wherein the hologram optical element has a lens effect for collimating laser light emitted from the semiconductor laser element.

17. A semiconductor laser device according to claim 12, wherein in the light-transmitting substrate, a thickness of a portion of the light-transmitting substrate through which incident light onto the servo-signal light-receiving element is transmitted, and a thickness of a portion of the light-transmitting substrate through which incident light onto the information-signal light-receiving element is transmitted may be individually set, whereby a focal point of the incident light onto the servo-signal light-receiving element and a focal point of the incident light onto the information-signal light-receiving element are individually adjusted.

18. A semiconductor laser device according to claim 12, wherein the package is sealed by the hologram optical element.

19. A semiconductor laser device according to claim 12, wherein said semiconductor laser element and said servo-signal light-receiving element are shielded.

20. A semiconductor laser device according to claim 12, wherein said diffraction grating is formed on a bottom plane of said hologram optical element.

21. A semiconductor laser device according to claim 12, wherein said polarizing element is a Wollaston prism.

* * * * *